(12) United States Patent
Barnard

(10) Patent No.: US 6,456,938 B1
(45) Date of Patent: Sep. 24, 2002

(54) PERSONAL DGPS GOLF COURSE CARTOGRAPHER, NAVIGATOR AND INTERNET WEB SITE WITH MAP EXCHANGE AND TUTOR

(76) Inventor: Kent Deon Barnard, 505 North Hill St., Wayne City, IL (US) 62895-0285

( * ) Notice: Subject to any disclaimer, the term of this patent is extended or adjusted under 35 U.S.C. 154(b) by 0 days.

(21) Appl. No.: 09/620,784

(22) Filed: Jul. 21, 2000

Related U.S. Application Data

(60) Provisional application No. 60/145,143, filed on Jul. 23, 1999.

(51) Int. Cl.⁷ .............................. G01S 5/00; G01C 21/00
(52) U.S. Cl. ..................... 701/213; 701/208; 701/215; 342/357.03; 342/35.09; 340/990; 473/407
(58) Field of Search ................................ 701/213, 208, 701/215; 342/357.03, 357.06, 357.09, 357.13; 340/990, 995; 473/407

(56) References Cited

U.S. PATENT DOCUMENTS

| | | | | |
|---|---|---|---|---|
| 4,910,677 A | * | 3/1990 | Remedio et al. | 364/410 |
| 5,127,044 A | * | 6/1992 | Bonito et al. | 379/88 |
| 5,214,757 A | | 5/1993 | Mauney et al. | 395/161 |
| 5,245,537 A | | 9/1993 | Barber | 364/410 |
| 5,364,093 A | | 11/1994 | Huston et al. | 273/32 R |
| 5,434,789 A | | 7/1995 | Fraker et al. | 364/460 |
| 5,438,518 A | | 8/1995 | Bianco et al | 364/460 |
| 5,469,175 A | | 11/1995 | Boman | 342/357 |
| 5,507,485 A | | 4/1996 | Fisher | 273/32 R |

(List continued on next page.)

FOREIGN PATENT DOCUMENTS

| | | | | |
|---|---|---|---|---|
| GB | 2249202 A | * | 4/1992 | A63B/69/36 |
| GB | 2271063 A | * | 4/1994 | A63B/71/06 |
| JP | 08057105 A | * | 3/1996 | A63B/71/06 |
| JP | 10216294 A | * | 8/1998 | A63B/71/06 |
| WO | WO-96/40387 A1 | * | 12/1996 | A63B/57/00 |

OTHER PUBLICATIONS

Grossman, John, "The Wiring of the Green", Inc. Technology, pp. 55–58 (1996, No. 4).

Sales Literature/Specifications by Communications Systems Internatinonal, Inc. for the "GBX–PRO ™ Combined GPS/Beacon Receiver", Copyright 1997.

(List continued on next page.)

Primary Examiner—Michael J. Zanelli
Assistant Examiner—Eric M Gibson
(74) Attorney, Agent, or Firm—Thompson Coburn LLP; Gregory E. Upchurch; David R. Deal

(57) ABSTRACT

A personal owned palm-held device consisting of software executed on a palm-held personal computer (PC) saddled into and connected directly to a dGPS receiver such that an individual golf player may map a golf course by traversing its attributes, displaying said map and collecting golf play data for any golf course. In addition, the ability to upload and download golf course maps to an Internet web site shall reduce the need for subsequent users to repeat the effort of mapping the same course more than once. Also, downloadable courses will facilitate the use of the palm-held PC by users that do not have a dGPS attachment. When used without a dGPS attachment, ball locations will be determined manually by estimating the ball location with reference to visual salient course attributes.

86 Claims, 22 Drawing Sheets

U.S. PATENT DOCUMENTS

| | | | |
|---|---|---|---|
| 5,524,081 A | 6/1996 | Paul ........................... | 364/460 |
| 5,528,248 A | 6/1996 | Steiner et al. .............. | 342/357 |
| 5,528,518 A | 6/1996 | Bradshaw et al. .......... | 364/561 |
| 5,558,333 A | 9/1996 | Kelson et al. .............. | 473/131 |
| 5,664,880 A | 9/1997 | Johnson et al. ............. | 364/410 |
| 5,685,786 A | 11/1997 | Dudley ....................... | 473/407 |
| 5,689,431 A | 11/1997 | Rudow et al. ........... | 364/449.7 |
| 5,699,244 A | 12/1997 | Clark, Jr. et al. ........... | 364/420 |
| 5,740,077 A | 4/1998 | Reeves ....................... | 364/460 |
| 5,772,534 A | 6/1998 | Dudley ....................... | 473/407 |
| 5,779,566 A * | 7/1998 | Wilens ....................... | 473/407 |
| 5,797,809 A * | 8/1998 | Hyuga ........................ | 473/407 |
| 5,802,492 A | 9/1998 | DeLorme et al. ........... | 701/200 |
| 5,810,680 A | 9/1998 | Lobb et al. ................. | 473/407 |
| 5,835,896 A | 11/1998 | Fisher et al. .................. | 705/37 |
| 5,873,797 A | 2/1999 | Garn ......................... | 473/407 |
| 5,878,369 A * | 3/1999 | Rudow et al. .............. | 701/215 |
| 5,882,269 A | 3/1999 | Lewis ........................ | 473/407 |
| 5,904,727 A * | 5/1999 | Prabhakaran ............... | 701/208 |
| 5,949,679 A * | 9/1999 | Born et al. .............. | 364/410.1 |
| 6,029,121 A * | 2/2000 | Stashko ....................... | 702/158 |
| 6,025,512 A * | 4/2000 | Dean et al. ................... | 705/17 |
| 6,060,991 A * | 5/2000 | Moriarty et al. ............ | 473/407 |
| 6,111,541 A * | 8/2000 | Karmel .................. | 342/357.13 |
| 6,171,199 B1 * | 1/2001 | Cohodas et al. ............ | 473/131 |
| 6,263,279 B1 * | 7/2001 | Bianco et al. .............. | 701/213 |

OTHER PUBLICATIONS

Sales Literature/Specifications by Pacific Crest corporation, for the "Skipperbld OEM MSK Beacon Receiver", Copyright 1996.

Internet Web Site of Differential Corrections, Inc., http://www.dgps.com, No date Sales Literature/Specification by Differential Corrections Inc., Copyright 1997, "OEM 4000, High Performance, credit card sized, FM receiver for Differential GPS embedded applications".

Internet Web Site of Karrie Communications "Intelligolf ™", http:www.intelligolf.com a software and service provider, copyright 1998.

Sales Literature/Specifications by Starlink for the "Starlink Invicta 210 GPS/Beacon Receiver Board" Not Dated.

Hurn, Jeff, "Differential GPS Explained", Copyright 1993 by Trimble Navigation Limited.

Sales Literature/Specifications by Sport–Tronix USA, Inc. for the "Golf Score Master System™" No date.

GPS Applications for Golf Course Measuring and Mapping; Maj. Steven Fleming, 2nd Lt. Christopher Oxendine, Cadet Jason Maassel, Dept. of Geography and Environmental Engineering, United States Military Academy, at http://www.georesearch.com/confer/fleming.htm, 1997.

Press Release entitled "Trimble and ProShot Golf set New Course for GPS" announced at 1996 PGA Merchandise Show.

Sales Literature/Specifications by Garmin International for "PhaseTrac 12™", "MultiTrak 8™" and "TracPak™", Copyright 1995.

Sales Literature/Specifications by Ashtech Inc. for the "GG24™ Receiver", Copyright Jun. 1996.

Sales Literature/Specfications by Ashtech Inc. for the "G12™ GPS Board", Copyright May 1996.

Sales Literatuare/Specifications by Ashtech Inc. for the "G8™ GPS Board", Copyright Sep. 1997.

Sales Literature/Specifications by Trimble Navigation Limited for the "Lassen™–SK8 GPS Board For Fast Integration", Copyright Mar. 1996.

Sales Literature/Specifications by Canadian Marconi Company, Components Division, GPS OEM Group for the "12–channel Superstar GPS Receiver OEM Module", Superstar 07/98.

Reed, Morgan D., "An Operational Airborne LIDAR Survey System Using Kinematic DGPS"; Presented at Institute of Navigation's ION GPS 98 in Nashville, TN.

http://www.green.com/golf.htm, "The Global Positioning System (GPS) and Golf" 1997—Greenfield Associates.

Sales Literature/Specifications by Bushnell for the Yardage Pro 400, 800 and Component laser range finders. 1998 Bushnell Corporation.

Sales Literature/For the "Inforemer 2000" Course Management System by Inforetech Golf Technology, 2000, Inc.

Sales Literature for the "Spyder 9000 System" by Wuenite Corporation 1998 by Quenite Corporation.

Sales Literature for "ParView" by ParView No Date.

Sales Literature for "Omnigolf System" by ProShot No Date.

Sales Literature for "Prolink" by Prolink No Date.

Sales Literature for the "The Spotter System" by Sports Guide Inc. No Date.

Sales Literature/Specifications by Communications Systems International, Inc. "SBX–2® The Intelligent Radiobeacon Receiver Engine", Copyright 1997.

* cited by examiner

| | | AREA | A or L | A/L/Pt | LINE | POINT |
|---|---|---|---|---|---|---|
| SETUP > | | TEE | BUNKR | TREE | PATH | PIN |
| DGPS > | | FRWAY | ROUGH | BUSH | OB | C-o-G |
| LINKS > | | GREEN | WATER | ROCK | DITCH | |
| EDIT > | | HOLE | BLDG | MOUND | | |
| MARK > | | | | | | |
| VIEW > | | BACK | | OTHER | | |

|  | TEE | FRWAY | GREEN | HOLE | BUNKR | ROUGH | WATER | TREE | BUSH | ROCK | MOUND | OTHER | PATH | OB | DITCH | CoG | FoG | PIN |
|---|---|---|---|---|---|---|---|---|---|---|---|---|---|---|---|---|---|---|
| Area | X | X | X | X | X | X | X | X | X | X | X | X |  |  |  |  |  |  |
| Line |  |  |  |  | X | X | X | X | X | X | X | X | X | X | X |  |  |  |
| Point |  |  |  |  |  |  |  | X | X | X | X | X |  |  |  | X | X | X |
| Hole Association | X | X | X | X | X | O | O | O | O | O | O | O | O | O | O | X | X | X |
| Mapping log rate (Hz) | | | | | | | | | | | | | | | | | | |
| Walking | 1 | 1/3 | 1 | 1/3 | 1 | 1 | 1 | na | na | na | na | 1 | 1/3 | 1/3 | 1 | na | na | na |
| Riding | 1 | 1 | 1 | 1 | 1 | 1 | 1 | 1 | 1 | 1 | 1 | 1 | 1 | 1 | 1 | 1 | 1 | 1 |

Mark Green Strokes
   ◉ Yes   ○ No

Green Reference Point
   ◉ Daily Pin Placement
   ○ Center of Green
   ○ Front of Green System Units
   ◉ English US (Yards)
   ○ Metric (Meters)

Cursor Ghost Lines
   ○ On   ◉ Off

Display Elevation Window
   ○ Yes   ◉ No

Default Target Cursor Distance: 999
   ○ feet   ◉ meters

Antenna Height: 999

Concentric Rover Circles
   ○ On   ◉ Off
   ○ yards/meters   ◉ feet

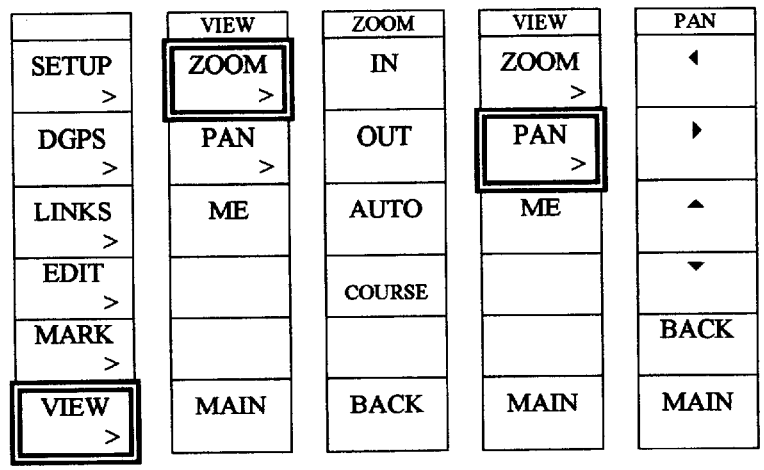
FIG. 24
| Target Cursor | Point | ✕ |
|---|---|---|
| Lie Marker | Point | + |
| Target Marker | Point | × |
| Pin | Point | ⚑ |
FIG. 25
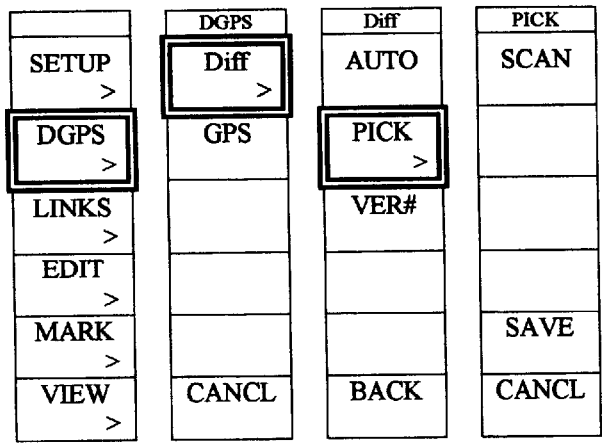
FIG. 26

| PICK SCAN | Transmitter Location | Signal Strength/Signal to Noise Ratio | | Distance (miles) |
|---|---|---|---|---|
| | St Louis, MO | ------------\|----- | 65/25 | 73 |
| | Rock Island, IL | ----------\|--- | 51/14 | 162 |
| | Louisville, KY | ---------\|-- | 43/12 | 105 |
| SAVE | Memphis, TN | --------\|-- | 39/11 | 135 |
| CANCL | Kansas City, MO | ---\|- | 15/5 | 187 |

FIG. 27

| MSG | Data | Format |
|---|---|---|
| GGA | UTC of Position | hhmmss.ss |
| GGA | Latitude, Direction | ddmm.mmmmmm, X |
| GGA | Longitude, Direction | dddmm.mmmmmm, X |
| GGA | Quality<br>1. Autonomous Position (GPS SPS mode)<br>2. RTCM differential corrected position | 9 |
| GGA | # of Satellites in use | 99 |
| GGA | HDOP | |
| GGA | Age of Differential | 999 |
| GGA | Diff. Station ID | 9999 |
| RMC | Status (Null, A, V) | X |
| RMC | Date | mmddyy |

FIG. 28

| Feature | Type | Symbol |
|---|---|---|
| Hole | Area | na |
| Tee Box | Area | Solid line |
| Green | Area | Solid line |
| Fairway | Area | Solid line |
| Rough | Area | na |
| Ditch | Line1 | Solid line |
| Building | Area | Solid line |
| Bunker | Area | ⋮⋮⋮ |
| Water | Area | ~ |
| Bush | Point | ▼ |
| Tree | Point | ♣ |
| Rock | Point | na |
| Mound | Point | na |
| Cart Path | Line3 | 6' wide solid line |
| Out of Bounds | Line2 | . . . . . |
| Flag or Pin | Point | ⚑ |
| Area too small to display | Area | ✤ |
| Current Location | Point | + |

FIG. 29

PERSONAL DGPS GOLF COURSE CARTOGRAPHER, NAVIGATOR AND INTERNET WEB SITE WITH MAP EXCHANGE AND TUTOR

CROSS-REFERENCE TO RELATED APPLICATIONS

This application claims the priority of Provisional Application No. 60/145,143, filed Jul. 23, 1999.

STATEMENT REGARDING FEDERALLY SPONSORED RESEARCH OR DEVELOPMENT

Not applicable.

BACKGROUND OF THE INVENTION

Golfers naturally pursue methods and tools to help them improve their golf game. For example, learning new personal strategies for a particular course or hole on a local range or gaining additional information of a course before first playing it can provide improved results. One of the informational tools currently available to a golfer is a printed scorecard or printed graphical course yardage guide. The scorecard provides a basic score keeping function and course specifications including approximate yardage per tee box. The graphical course guide typically provides a graphical representation of the course layout. It can also provide distances to some features for each hole.

The value of an informational tool to a golfer increases as the amount and accuracy of information the tool provides increases. There are several U.S. patents which relate to Global Positioning System (GPS) which provide accurate positional information to a golfer. Many of these patents are categorizable as relating to "cart mounted inventions intended for course management communications and positional aids." These are under the control of the course manager and are, therefore, optimized for the manager's use. Representative patents include:

- U.S. Pat. No. 5,364,093; Golf Distance Measuring System and Method;
- U.S. Pat. No. 5,524,081; Golf Information and Course Management System;
- U.S. Pat. No. 5,685,786; Passive Golf Information System and Method;
- U.S. Pat. No. 5,689,431; Golf Course Yardage and Information System; and
- U.S. Pat. No. 5,740,077; Golf Round Data System.

These patents describe systems that are designed for purchase, installation, configuration and management by a golf course owner or manager. They fail to disclose a golfer owned and operated position information based system for use on any golf course by the golfer. Also, a disadvantage of course based systems is that golfers may feel continually monitored or bombarded by unwanted advertisements the course provided system creates, thus diminishing the quality of the golfing experience. Additionally, course based systems necessitate locating the GPS antenna on a self-propelled or pull-type cart which can be difficult or impossible to locate exactly where the golf ball is lying as is desirable for optimum performance.

Other systems, including various hand-held GPS based position information tools, lack many of the beneficial elements of the present invention as will be seen.

Various GPS related technologies are involved in the implementation and practice of prior systems and some embodiments of the present invention. By way of general background, a brief discussion of these technologies follows.

GPS/GLONASS

The Global Positioning System (GPS) is a satellite based navigation system operated and maintained by the U.S. Government. A constellation of 24 satellites provides worldwide, 24 hour, 3 dimensional (3-D) coverage. The determination of positions on a golf course utilizing GPS is well known in the art, and is explained in detail in U.S. Pat. No. 5,507,485, entitled GOLF COMPUTER AND GOLF REPLAY DEVICE which is incorporated herein by reference.

Since the GPS system was originally conceived as a military tool, the accuracy available to civilians may be degraded by the use of selective availability (SA). SA dithers the GPS signal to degrade its horizontal locational accuracy to within 100 meters 95% of the time. With SA off, as it is now, the accuracy of GPS based position information is within 12 meters, 95% of the time; and to within less than 6 meters, 50% of the time. The receipt and processing of GPS signals are now commonly accomplished using compact devices that are well known in the art. U.S. Pat. No. 5,271,034, entitled SYSTEM AND METHOD FOR RECEIVING AND DECODING GLOBAL POSITIONING SATELLITE SIGNALS, incorporated herein by reference, describes one such device. Most GPS receivers have from 5 to 12 channels, each channel receiving signals from a single satellite, for simultaneous line of site tracking of as many satellites as possible.

GLONASS is a Russian controlled satellite constellation providing substantially the same locational functionality as GPS. Other satellite constellations may be developed in the future that will provide adequate autonomous accuracies under 1 meter. There are numerous methods and systems of increasing the accuracy of satellite based position information, a short review of the most popular such methods follows.

Real Time Differential GPS

Differential Satellite Navigation Systems (DSNS), such as Differential GPS (dGPS) and Differential GLONASS (dGLONASS), utilize a strategy to improve the accuracy of GPS position determination information. It is based on the determination that the main sources of positional error in GPS are approximately equal over very large areas. DSNS use a comparison between the actual known position of a reference receiver and the position of the reference receiver calculated from the satellite system to determine what correction is necessary to reduce satellite system calculated position errors, known as psuedo-range errors, in the general vicinity of the reference receiver. For example, dGPS and DGLONASS systems use reference receivers at surveyed locations. These reference receivers are programed with their surveyed location information. They then receive signals from the satellites and calculate their position from that information. The reference receivers then establish the difference between their surveyed position and their calculated position (the pseudo range error) and broadcast the corrections that allow roving receivers in the region to correct their position calculations for these psuedo-range errors. This allows for the removal of the negative effects that SA, the ionosphere and troposphere and other error sources can have on positional accuracy. A common nonproprietary broadcast standard for this error-correcting information is RTCM SC-104 Version 2.

WAAS Differential

A Wide Area Augmentation System (WAAS) is being developed by the Federal Aviation Administration (FAA) to provide differential corrections on the same frequency as the GPS satellites. When operational, WAAS would eliminate the need for additional receivers currently employed for differential correction.

Marine Beacon Differential

Worldwide coastal and inland waterway navigation is aided through the use of radio beacons broadcasting differential corrections on the AM band in the frequency range of 283.5 kHz to 325 kHz. This broadcast signal has a range of a few hundred miles. As with GPS, receipt of the satellite signals is free—there is no periodic fee associated with the reception and use of this signal. This type of marine beacon radio signal encompasses the most populous golf courses in the world. Many world governments are currently expanding their radio beacon coverage areas and are planning new land-only locations. The Federal Government of the United States of America has committed, in addition to the United States Coast Guard (USCG) transmitters, to construct a National Differential GPS (NdGPS) system to provide redundant coverage of the contiguous United States. Further information can be found at the URL http://www.navcen.uscg.mil.

FM Subcarrier Differential

Differential Corrections can also be broadcast on a FM subcarrier with a range of about 30 to 50 kilometers from the transmitter. FM corrections are primarily proprietary broadcasts that have a periodic fee associated with their use.

Extended Satellite Differential (L Band)

In Extended Differential GPS systems, the differential reference stations are networked together to one or more master stations. The master station receives the error corrections from each reference station, then combines them into a differential format that will be valid over an extended range. The correction is then broadcast to users across the extended range, often via a satellite communications link. Satellite corrections are primarily proprietary broadcasts that have a periodic fee associated with their use.

Proprietary Local Differential

A private reference station situated near roving users (approximately 20 miles maximum range) can provide local differential corrections. These corrections can be broadcast, for example, on the 900 MHz or 2.4 or 3.6 GHz license-free frequencies. This is the preferred method of differential broadcast for cart-mounted and club owned or leased dGPS systems in the golf industry. The proprietary radio link typically provides two way digital communication between the club house and roving carts to facilitate differential correction, automatic vehicle location, advertisement transmission and course play monitoring by the course manager.

Internet Differential

Another method of supplying real time differential corrections to a roving GPS receiver on any golf course would be with a real time Radio Frequency (RF) Internet connection. Through this method, several surveyed locations such as cell phone towers would receive GPS signals, formulate correction values and make them available via the Internet. The roving unit requests the correction data, as needed, from the Internet server correction database.

Other errors in GPS receiver position determination which differential correction does not address, include the following:

Multipath Errors and Corrections

Direct signals are those received by the GPS receiver in a "line of sight" path from the satellite. Indirect signals are those which reflect off some other object before being received by the receiver. These indirect signals are known as multipath. Rejection of the indirect signals is termed multipath mitigation. When GPS receivers cannot distinguish between direct and indirect signals, position and measurement errors can occur. Receivers such as those manufactured by Ashtech are capable of using proprietary mitigation methods such as Edge Correlator™ or Strobe Correlator™ multipath mitigation to improve positional determination accuracy on the golf course. Antenna design can also mitigate multipath; choke rings and NovAtel's recent Pinwheel Technology™, as used in its GPS 600 antennas, are two examples of multipath mitigating antennas.

Dilution of Precision

Dilution of precision (DOP) is a measure of the receiver/satellite(s) geometry. DOP relates the statistical accuracy of the GPS measurements to the statistical accuracy of the calculated position information. Geometric Dilution of Precision (GDOP) is composed of Time Dilution of Precision (TDOP) and Position Dilution of Precision (PDOP). PDOP is composed of Horizontal Dilution of Precision (HDOP) and Vertical Dilution of Precision (VDOP). The interrelation of these elements is described by the formula $GDOP^2=PDOP^2+TDOP^2$ and $PDOP^2=HDOP^2+VDOP^2$. HDOP becomes an issue when a user on a golf course moves into and out of areas that are blocked from satellite reception, primarily by trees. When satellites on the horizon are blocked from view of the receiver and only satellites from more directly over head are used for the position solution, the HDOP value will increase. For example, an HDOP of 2 means that the standard deviation of the total error in a given position information waypoint will be twice the standard deviation of the GPS pseudorange error.

The data broadcasts received by GPS receivers need to be in a format recognized by the receiver for it to utilize the broadcast to determine position. Likewise, data transmitted by GPS receivers need to be in a format recognized for the receiving unit to utilize the data. Standardization of these formats facilitates wide compatibility among different forms of equipment. The following are two such standardized formats.

National Marine Electronics Association (NMEA)

NMEA has published standard formats that GPS receivers may transmit data in. An example is "NMEA 0183 Standard Version 2.1". One of the data strings in the format is the GGA GPS Position Message. The format may be as follows:

$GPGGA,m1,m2,c1,m3,c2,d1,d2,f1,f2,M,f3,M,f4,d3*cc

The table below defines the format for this message:

| | Description |
|---|---|
| m1 | Current UTC time of position fix in hours, minutes, and seconds (hhmmss.ss) |
| m2 | Latitude component of position in degrees and decimal minutes (ddmm.mmmmmm) |
| c1 | Direction of Latitude N = North, S = South |
| m3 | Longitudinal component of position in degrees and decimal minutes (dddmm.mmmmmm) |
| c2 | Direction of Longitude E = East, W = West |
| d1 | Position type<br>0. Fix not available or invalid<br>1. Autonomous Position (GPS SPS mode)<br>2. RTCM differential corrected position or CPD float position<br>9. Position computed using almanac information |
| d2 | Number of GPS satellites being used in the position computation |
| f1 | Horizontal dilution of precision (HDOP) |
| f2 | Altitude in meters above the reference ellipsoid. |
| M | Altitude units M = meters |
| f3 | Geoidal seperation |
| M | Geoidal seperation units M = meters |
| d3 | Age of differential corrections (seconds) |

-continued

| | Description |
|---|---|
| d4 | Differential reference Station ID |
| cc | Checksum |

RTCM SC-104

Another standard is the RTCM Special Committee 104 Recommended Standards for Differential Global Navigation Satellite Systems Service, Version 2.2, known as RTCMSC-104 and published in RTCM PAPER 11-98/SC104-STD. RTCM SC-104 is the standard format used for the broadcast of differential correction data by marine beacon reference stations. This is also the format accepted by GPS engines when differential correction data is passed to them via a communication port from a differential receiver.

SUMMARY OF THE INVENTION

An object of the present invention is to provide an individual player owned dGPS system that enables a golfer to positionally map and/or play a golf course whether or not the course offers positional equipment or information.

Another object of the present invention is to provide previously created maps for downloading and editing by users and to provide for the uploading of maps and play data through a public access computer system such as the Internet.

A third object of the present invention is to provide a dGPS system that would receive WAAS correction information on one of its channels. The invention will incorporate the capability to include the use of WAAS as it becomes available, thus reducing the number of receiver/antenna combinations required from two to one. This would also enable the provision of a reliably accurate locational device with lower power requirements.

A fourth object of the present invention is to provide a dGPS system capable of receiving a signal broadcast from a reference station conforming to the International Association of Maritime Aids to Navigation and Lighthouse Authorities standards. One embodiment of the differential beacon receiver implements multiple frequency reception of beacon data to allow automatic selection of the beacon signal with the best reception. Another embodiment employs a multiple channel beacon receiver using correction from 2 or more transmitters for interpolation to ameliorate atmospheric induced errors in the rover's location.

A fifth object of the present invention is to provide a dGPS system that utilizes a FM differential receiver for the reduction of position determination errors.

A sixth object of the present invention is to provide a dGPS system that utilizes a satellite differential receiver for the reduction of position determination errors.

A seventh object of the present invention is to provide a dGPS system that utilizes multipath mitigation techniques for the reduction of position determination errors.

An eighth object of the present invention is to provide a dGPS system that utilizes differing depictions of course features corresponding to their relative HDOP, differential signal reception status, and satellite count to enable the user to evaluate the quality of the attribute mapping.

A ninth object of the present invention is to provide a dGPS system that utilizes the NMEA data message format as well as combinations of other message formats such as GLL, GSA, GSV, RMC, POS to achieve similar functionality.

A tenth object of the present invention is to provide a dGPS system in which the portable device is of modular construction to provide enhanced flexibility of utilization, increased battery life, and ease of system upgrading.

Another object of the present invention is to provide for a personal dGPS system that provides the user with complete autonomy from course owners and course owned systems with no additional reoccurring service fees or compensation for its use.

Another object of the present invention is to provide a dGPS system that is operational on golf courses that do not have on-site positioning systems.

Another object of the present invention is to provide a personal dGPS system that enables a user to transfer (upload and download) course maps over a public access computer network such as the Internet.

Another object of the present invention is to provide for a personal dGPS system that enables a player to archive, retrieve, and analyze a personal database of golf round statistics including locational data and scoring, as well as review and replay a round on a Personal Computer or at Web site. Furthermore, the invention avoids potentially incompatible play data gathered from differing course owned systems.

In one embodiment, this invention is operable without a golf cart, and carryable in one's hand or a golf bag. It may incorporate a belt clip for constant wearing, and may be held directly over a ball lie for greatest accuracy of positioning and ball lie recording.

The present invention provides the user with the tools to personally create a horizontal vector map of any golf course as needed. The invention provides continually zoomable vector definitions (maps) of greens, fairways, hazards, boundaries, holes, cups, and other golf course attributes.

The present invention provides a heretofore absent method of golf course map creation, ongoing map modification, and map exchange between golfers worldwide via publicly accessible networks such as the Internet. It also provides a novel, on-site, dGPS mapping method and Graphical User Interface (GUI) mapping software specifically designed for easily mapping golf courses and especially effective for on site real-time editing to correct errors in a map.

One embodiment of the present invention enables the user to determine an accurate change in elevation from a current position to a practically unlimited selection of target locations.

The present invention includes a receive-only function when in operation. The elimination of the necessity of continuously sending data to another system via Radio Frequency (RF) vastly reduces power demands.

A further benefit of the present invention over a course owner controlled dGPS device is the availability of the dGPS module to the user for applications other than golf. For example, it may be used in a vehicle with a different set of software suited for vehicle navigation. With appropriate software, hikers, hunters, bikers, or farmer can benefit from its capabilities. Utility Companies may use it for locating structures. The flexibility of the present invention's modular system enables the use of modules suitable for diverse applications.

BRIEF DESCRIPTION OF THE DRAWINGS

FIG. 24 shows a progression of left menu columns following an initial pressing of VIEW and subsequent pressings of ZOOM and PAN during operation of the course player software.

FIG. 25 shows a progression of left menu columns following an initial pressing of DGPS and subsequent pressings of DIFF and PICK during operation of the course player software.

FIG. 26 shows the various symbols unique to the course player software as depicted on the viewing display.

FIG. 27 shows the viewing display of the relative signal strengths of various differential transmitters being received by the differential GPS receiver.

FIG. 28 is a table of the format that various GPS data aspects are displayed in.

FIG. 29 is a table of the various symbols the course player and course mapper softwares depict the attributes of a golf course on the viewing display.

DETAILED DESCRIPTION OF THE PREFERRED EMBODIMENT

Figure 1:
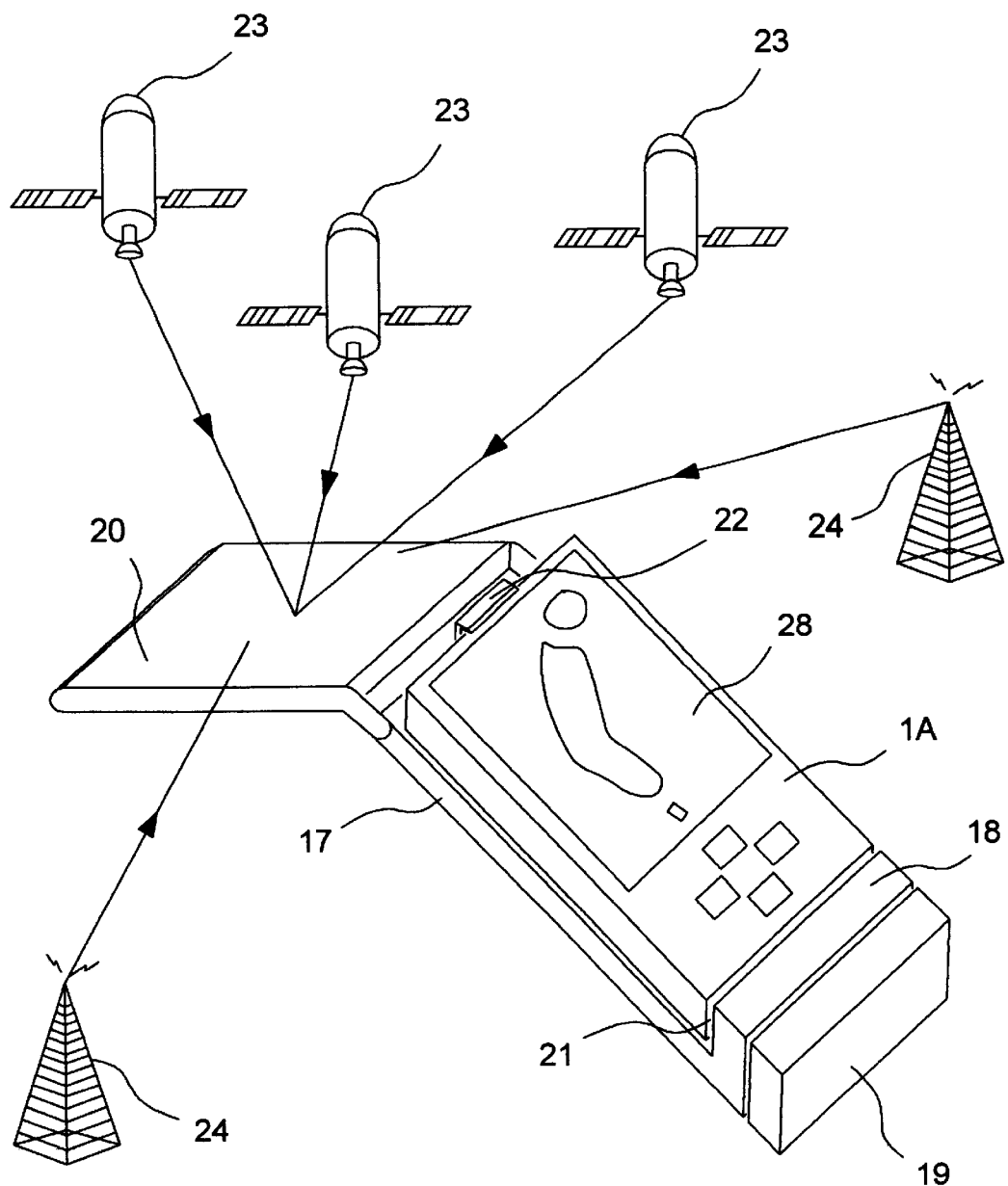
FIG. 1 is the palm-held modular satellite based position system of this invention.

It is to be understood that the invention disclosed within the following embodiments is not limited only to these embodiments. Furthermore, in application of the invention other embodiments and details may be implemented. The present invention is best described by referring to:

FIG. 1 depicts a dGPS receiver Position Module 17 connected to and saddling a display module 1A. In this embodiment, the dGPS receiver Position Module 17 comprises a main housing 18 for enclosing electronic circuits, and is in operative connection with a removable battery module 19 for providing power, a combined GPS and AM beacon differential antenna module 20, an electrical interface connector 21 between the Display Module 1A and the main housing 18, and an integrated lock tab 22 to hold the Display Module 1A to the position module 17. The electrical interface connector 21 may be a physical link complying with one or more of the following known standards or systems: an RS232 serial port; Universal Serial Bus ("USB") serial port or IEEE 1394. Connector 21 may also be a light wave link complying with industry standards including those of the Infrared Data Association ("IrDA") or a wireless radio frequency link using such standards as Bluetooth or others. The antenna module 20 simultaneously receives radio signals from multiple GPS satellites 23 and from multiple AM band beacon differential transmitters 24.

Modular Construction

An aspect of the embodiment of the present invention depicted in FIG. 1 is its modular construction. Modular construction facilitates ease of upgrade to enable ready adaptability to quickly changing designs of Display Modules 1A, and GPS and differential hardware, primarily the position module 17 and the antenna module 20. A Battery Module 19 fits on and is detachable from various Position Modules 17. Attaching the Battery Module 19 to the Position Modules 17 automatically makes an electrical connection through connector 21 for power and charging and communication. The Position Module 17 is detachable from a Display Module 1A which, in an embodiment, is a palm held computer. An Antenna Module 20 can carry all necessary antennas and may be detachable from the Position Module 17 to enable placement in a position for optimum reception. This form of modular construction allows the Display Module 1A to be available for other functions when not used with the Position Module 17.

Battery Module

Battery Module (BM) 19 include, but are not limited to, nickel cadmium, nickel metal hydride or lithium ion rechargeable battery pack such as a Motorola part number 97127. Attachment of a BM 19 to a PM 17 automatically creates an electrical connection for communication, power and other circuits between the BM 19 and PM 17. The BM 19 disconnects easily from the position module 17 to facilitate battery changes to provide extended golf playing time. The lower power requirements and primarily daytime use of the position module 17 enables the integration of solar cells into the BM 19 or other module to provide supplemental power or battery module 19 charging.

Antenna Module

The Antenna Module (AM) 20 houses all antennas 54 necessary for the device to function. Typically, a GPS antenna and a differential antenna are needed, though the WAAS will require only a GPS antenna. The antenna module 20 provides the ability to unplug the antenna module 20 from the position module 17 for the repositioning of the AM 20 to maintain line of site integrity to satellites. The AM 54 may be mounted remote from the PM 17 with a cable routed into the PM 17 to allow for satellite acquisition with minimum signal blockage. An AM 20 also allows for switchable antenna selections for the best fit to a specific application. A preferred embodiment may include a detachable and repositionable antenna module 20 that houses a GPS antenna and an H-field loop antenna, such as a Starlink H-Field MSK DGPS radiobeacon antenna, part number TBA-2, for AM Marine beacon signal reception.

Position Modules

The consumer may choose from a plurality of position modules 17. Various levels of accuracy, cost, differential source availability, power requirements, signal subscription cost and size will differentiate the position modules 17. It is expected that reductions in cost, size, weight and power requirement of position modules will be ongoing. An advantage of the present invention is the facilitation of position module upgrades as technologies improve.

Figure 30:
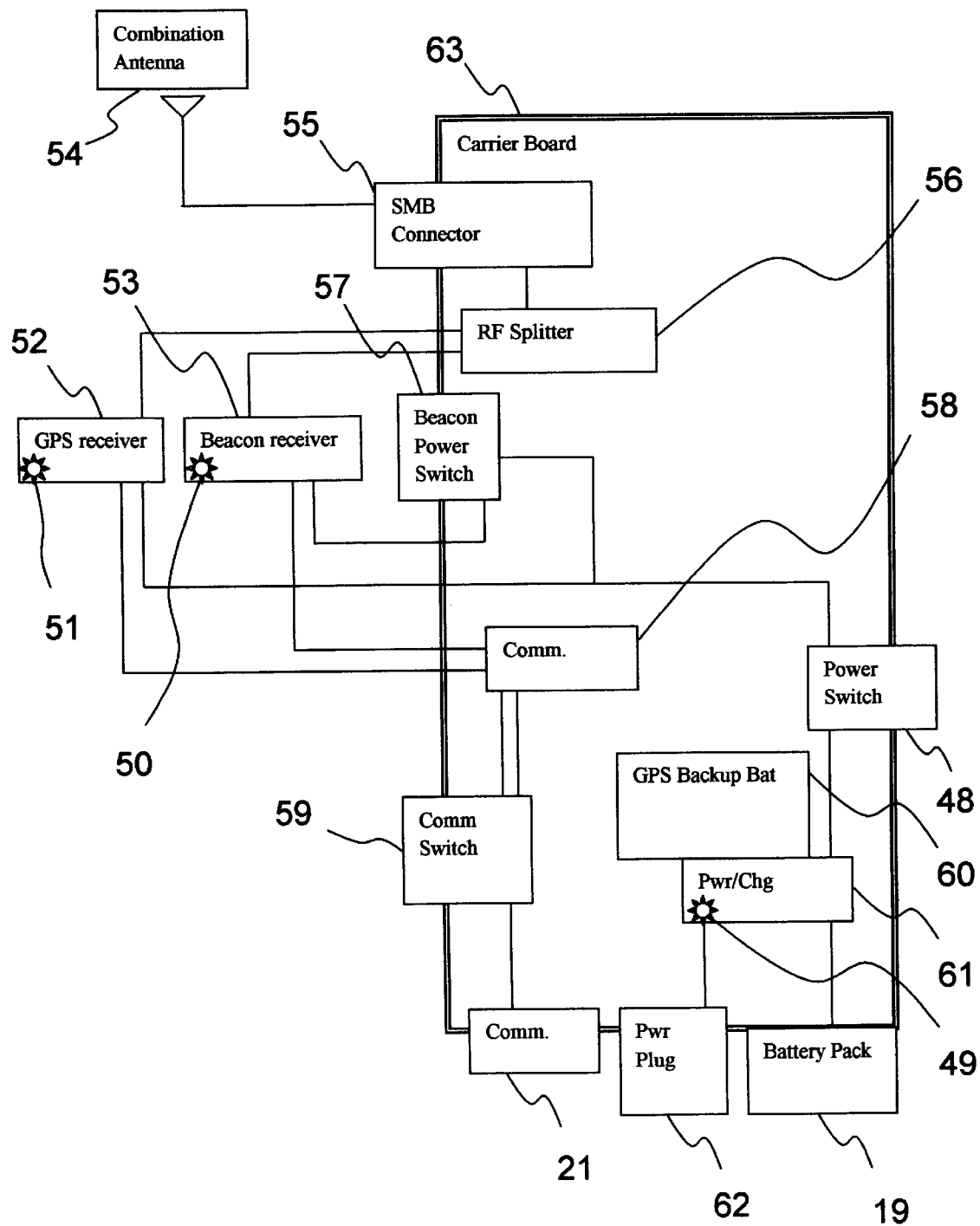
FIG. 30 is a schematic circuit diagram of the connections of the DGPS receiver hardware of the present invention.

A variety of position modules 17 are currently available. Referring now to FIG. 30, typically, a position module 17 will include a GPS component receiver 52 such as the Ashtech G8™ GPS receiver (part number 701067) or similar small form factor GPS engine, and may include a differential receiver 53. It will be understood, however, that any suitable Global Navigation Satellite System (GNSS) engine could be used to ensure compatibility with the desired GNSS system, i.e., 1) The US Federal Governments Global Positioning System; 2) Russia's GLONASS system; 3) The European Union's planned (GNSS); 4) Any other time based satellite location system signal. Similarly, the differential signal receiver 53 could use any of, but not be limited to, the following correction sources: 1) US Coast Guard or the International Association of Lighthouse Authorities Marine radio beacons in the 283.5–325 kHz range; 2) Satloc 450 MHz satellite; 3) Racal L band satellite corrections; 4) FM subcarrier; 5) proprietary local differential; 6) Omnistar L band satellite corrections; 7) WAAS; 8) Real time Internet correction data via radio frequencies (RF).

All position modules 17 will have a power on/off switch 48. Additionally, status and troubleshooting indicators (49, 50, 51) will inform the user of the current performance of the position module 17. One panel mounted LED 49 will indicate if sufficient battery power is being applied to the position module 17 for it to function. A second panel mounted LED 50, may be on when differential correction data is synchronized, and off if the data is not synchronized. If LED 50 is off for up to 15 seconds, the positional determination accuracy would not be greatly degraded. However, after a significantly longer period of time, positional accuracy would degrade. A third panel mounted LED 51 flashing in a selected repeated pattern, will indicate how many satellites were currently being used to calculate position.

One embodiment of the Position Module 17 and related modules is depicted in FIG. 30 and may include a marine beacon receiver 53 operating in the 283.5–325.0 kHz range such as a Communications System International, Inc. SBX-2, part number 9834-2181-0001. This differential receiver 53 consumes less than one watt of power, measures 3.0"× 2.0"×0.54" and weighs less than one ounce, valuable qualities for a personal palm-held device. A digital dual channel design in this receiver 53 uses digital signal processing (DSP) to search for and switch to beacons transmitting superior signals. The very fast acquisition of the USCG Marine Beacon signal by the SBX-2 receiver, allows this embodiment of the invention to employ an automatic power down of the differential receiver 53 to conserve battery power after a period of nonuse without causing undesirable operational delays. A touch of the display module screen 28 repowers the differential receiver 53 for the receipt of new differential data almost immediately.

A GPS or combination GPS/differential signal antenna module 54 is connected to the receiver module 17 via a SMB connector 55 or similar shielded connector to facilitate removal of the antenna module 54 from the receiver module 17. Removal of antenna 54 allows it to be placed in an optimal position to view a maximum number of satellites 23 in the sky. A RF splitter 56 is used to separate the GPS signal and the differential signal into their respective components and make them available to their respective receiver circuitry. A separate marine beacon receiver power switch 57 is optional and would allow the dGPS receiver 17 to function as a GPS only receiver with the differential correction circuitry and beacon receiver 53 inactive.

Communication circuitry 58 converts TTL level signals from the GPS receiver 52 and marine beacon receiver 53 circuitry into signals for communication with the palm-held computer 1A. A communication switch 59 is optional and would facilitate asynchronous communication between the computer 1A and both the GPS receiver 52 and marine beacon 53 receivers.

A backup battery 60 is used in the position module 17 to provide back-up power to the GPS receiver 52. This back-up power allows the GPS receiver 52 to store GPS satellite 23 almanac data. The almanac data allows the GPS receiver to predict the position of satellites in the GPS constellation when the receiver is powered up. This prediction ability allows the GPS receiver to greatly reduce the Time to First Fix (TFF). TFF is the amount of time it takes the GPS engine to provide its first location solution following a fresh power-up.

The preferred embodiment has a power conditioning/ charging circuit 61 to charge, regulate, convert and measure battery voltage in the Battery Module 19. A power plug 62 will allow the connection of an external power source and operation without the battery module 19. When the battery module 19 is present and an external power source (not depicted) is connected to the plug 62, the power/charging circuit 61 charges the battery module 19 from the external power source. The connector 21 provides an electrical connection between the display module 1A and the position module 17 for communication. This may be a RS 232 connection or even a direct connect to the display module 1A CPU's data and address bus (not depicted). A printed circuit carrier board 63 is used to electrically interconnect components and provide mechanical support. The RF splitter 56, GPS receiver 52, differential beacon receiver 53, as well as other components can alternatively be integrated into a single component.

Another embodiment of the invention incorporates a differentially corrected GPS/GLONASS receiver similar to the Ashtech GG24. One of the primary advantages of this type of receiver is the increased satellite coverage. This implementation contains 48 satellites in the combined and complete constellation. By increasing the pool of distributed satellites the receiver may select a set that will minimize the dilution of precision effects on the location calculation. Also, this greatly improves the possibility of acquiring the necessary minimum quantity of satellites for a location solution when in areas where tree cover, hills, rocks or other obstacles may block line of sight to GPS only satellites. Another advantage is a more accurate position solution than dGPS alone.

A baseline is a vector that interconnects the real-time location of the roving GPS/GLONASS satellite receiver and the surveyed location of the fixed GPS/GLONASS satellite receiver that is providing correction data. Baselines that will be experienced using a coast guard beacon for differential correction will vary from 20 to 140 miles. dGPS rover locational accuracy is typically proportional to baseline length. The following position modules, with known-in-the-art accuracy estimates for a 20 to 140 mile baseline range, and means of utilization, are employable in modular construction embodiments of the present invention:

Economy Marine Beacon Position Module: Employs an 8 channel, L1 frequency, C/A code Standard Positioning Service (SPS) GPS receiver. Varieties available include an Ashtech G8™ GPS receiver, part number 701067 and a Communications System International, Inc. SBX-2 digital differential beacon receiver. This receiver combination can provide positional determination accuracies of 1 to 3 meters, and a once per second frequency of horizontal real-time position solutions. This accuracy level is acceptable for ball lie recording and skill evaluation from the tee box and on the fairways. Distance measurements of this accuracy will be helpful to novice and moderate golfers. Typically, there are markers near the green to indicate distance to the green. However, on neither of the $2^{nd}$ shot of a par five nor near the green are there normally markers provided for ranging to hazards. The benefit of this unit on the green will depend on the skill of the golfer.

Standard Marine Beacon Position Module: Employs a 12-channel GPS code and carrier GPS receiver such as an Ashtech G12 GPS Board™ part number 990191 and a Communications System International, Inc. SBX-2 digital differential beacon receiver. This receiver combination can provide positional determination accuracies of 0.5 to 1 meter and can produce horizontal real-time position solutions up to 20 times per second. This accuracy level is acceptable for all aspects of play and mapping.

Premium Marine Beacon Position Module: Employs a 12-channel GPS code and carrier GPS and 12 channel GLONASS code and carrier receiver such as an Ashtech GG24 GPS Board™ part number 990229 and a Communications System International, Inc. SBX-2 digital, differential beacon receiver. This receiver combination can provide positional accuracies of 0.5 to 1 meter horizontal real-time position solutions at a frequency of once per second. This accuracy level is acceptable for all aspects of play and mapping. There will be noticeable accuracy improvements versus the economy and standard position modules described above on courses with many trees that may block the line of site to some satellites.

Display Module

The Display Module (DM) 1A is multifunctional and receptive to a broad range of attachments or extensions. Suitable DM's are commonly called Personal Data Assistants (PDAs) and include Compaq iPAQ model 3650 Pocket PC or similar palm held computer with either embedded Pocket PC or Microsoft Windows CE operating system (OS), 3Com Palm OS the Linux operating system as well as any other compatible present or future hardware/software combination. The DM capabilities will variously include displaying images in 2 or 3 dimensions, and raster or vector images in monochrome, grayscale or full color.

In another embodiment, if an operating Position Module 17 is connected to a Display Module 1A running the Course Player software (defined below), GPS location features automatically become available during the operation of the Course Player software. The limited display space on a palm held computer results in the displayed features of almost all golf holes as being elongated since, relative to display length, little display width is needed. The displayed information would thus make use of the left and or right sides of the Palm-PC display for purposes other than course-graphics such as user entry, touch sensitive buttons and distance and elevation display. The course or hole layout graphics may extend completely to the top and bottom pixels of the display device.

One aspect of the present invention is compatibility with built in, serial or compact flash card modems to facilitate data transfer with a web site or desktop PC. An embodiment employing a palm held computer with wireless Internet connection abilities will allow the unit to connect directly to the Internet via a wireless RF link, to transfer golf course maps and other information to and from a web site.

The modular approach of the present invention enables use of the Course Player game management software without a functioning Position Module 17 attached. In this embodiment, when golfing, the user estimates his actual location by keying on visual attributes of the course. On the Display Module 1A, a cursor is then moved over the displayed map of the course and the estimated location, which may or may not be the ball location, is plotted and the other features of the system are used. After manually plotting the current location, all other distance and statistic features of the Course Player software function as they do when a Position Module 17 is used (described below). This allows the product to be used, without dGPS, after some courses have been mapped and input into the Display Module 1A for example, from the website via the Internet.

If so desired, the present invention may be constructed so that the Display Module 1A Position Module 17 and Battery Module 19 are integrated into one unit, while maintaining all the other features and benefits of the present invention except those directly resulting from modular construction.

Methods of Golf Course Map Creation

Figure 3:
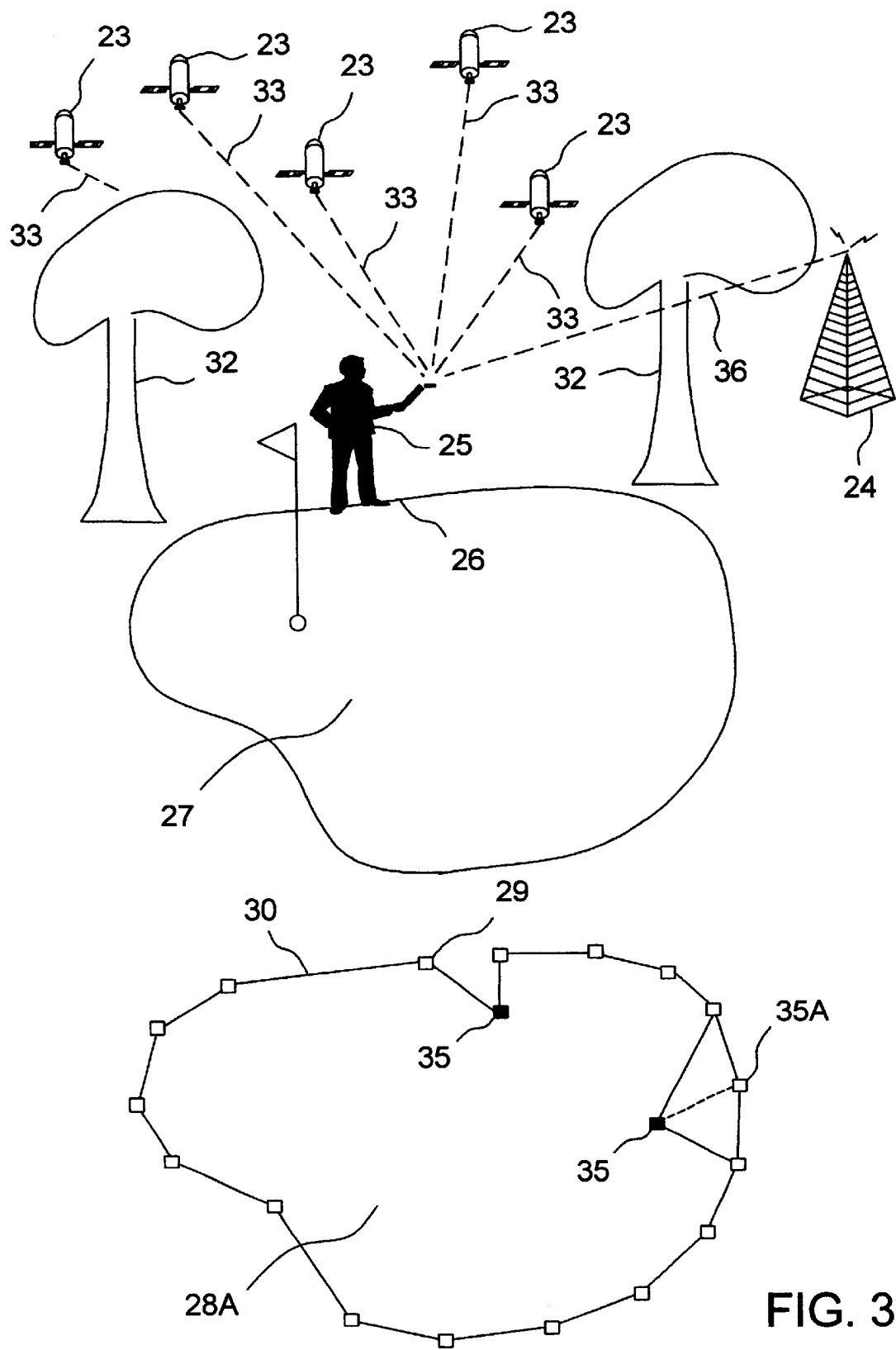
FIG. 3 is a diagram of the mapping procedure utilizing the position quality tool.
Figure 4A:
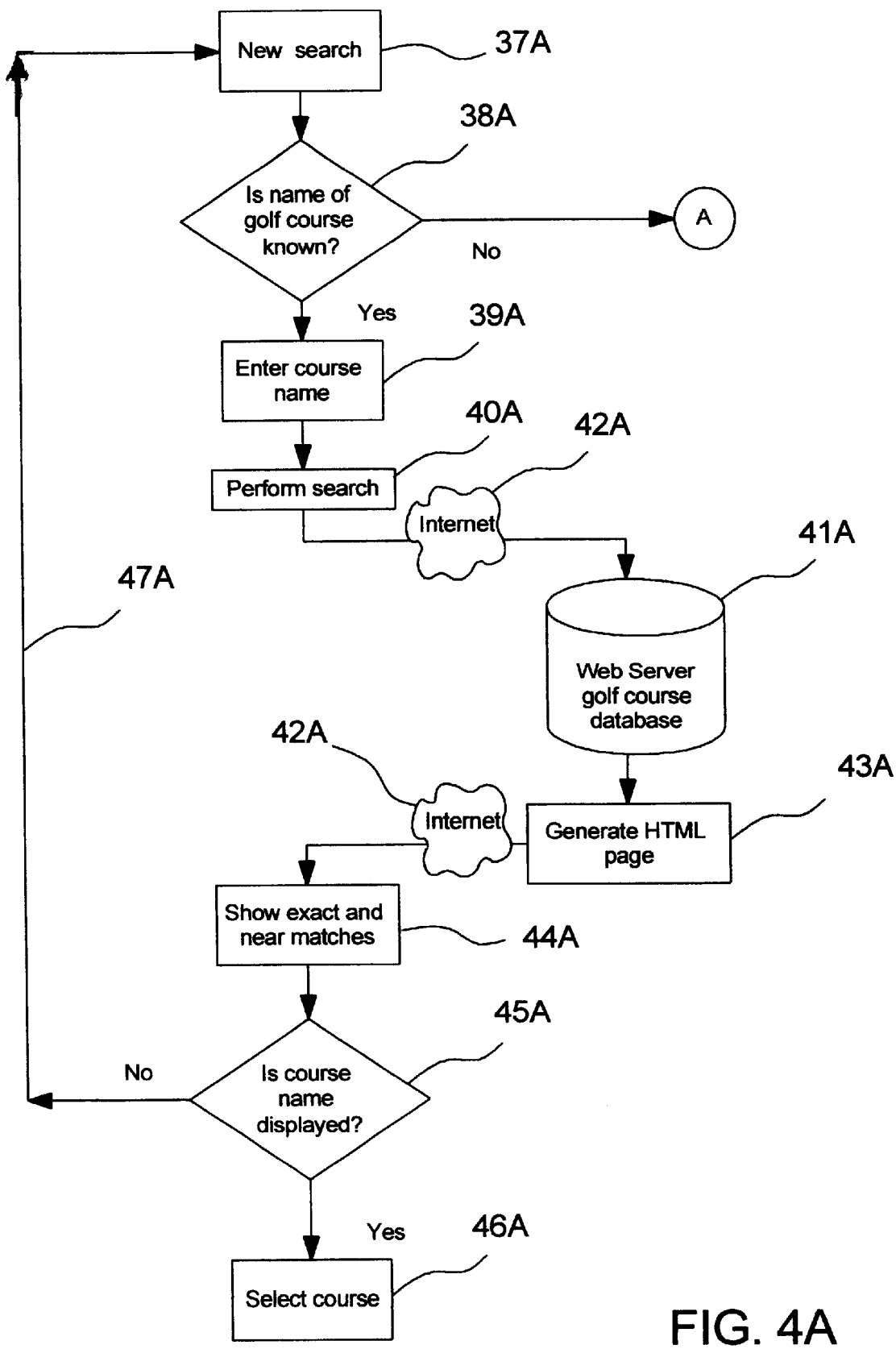
FIGS. 4 (A through E) depict, in flowchart form, the processes relating to searching for a golf course map in the present invention.
Figure 4B:
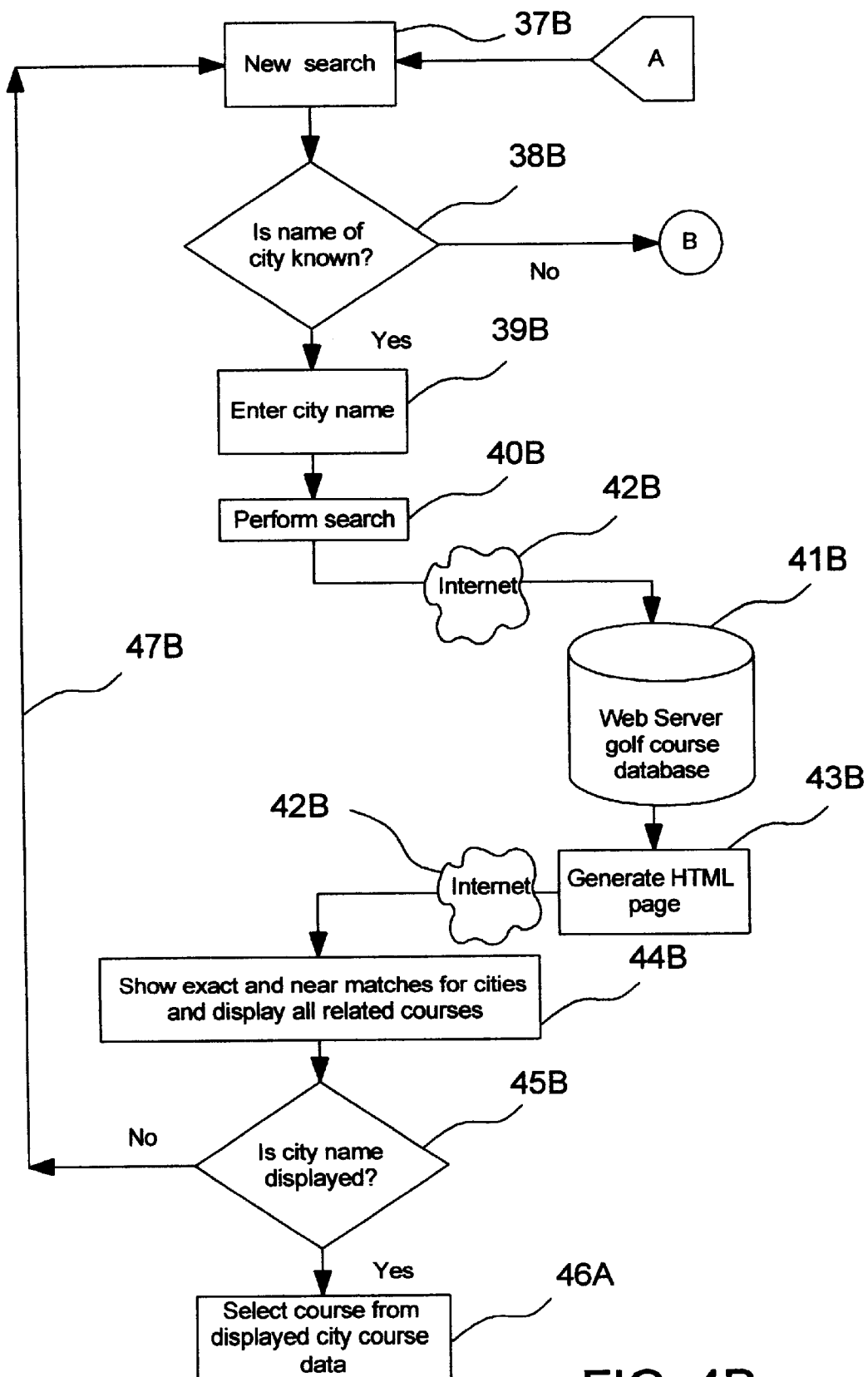
Figure 4C:
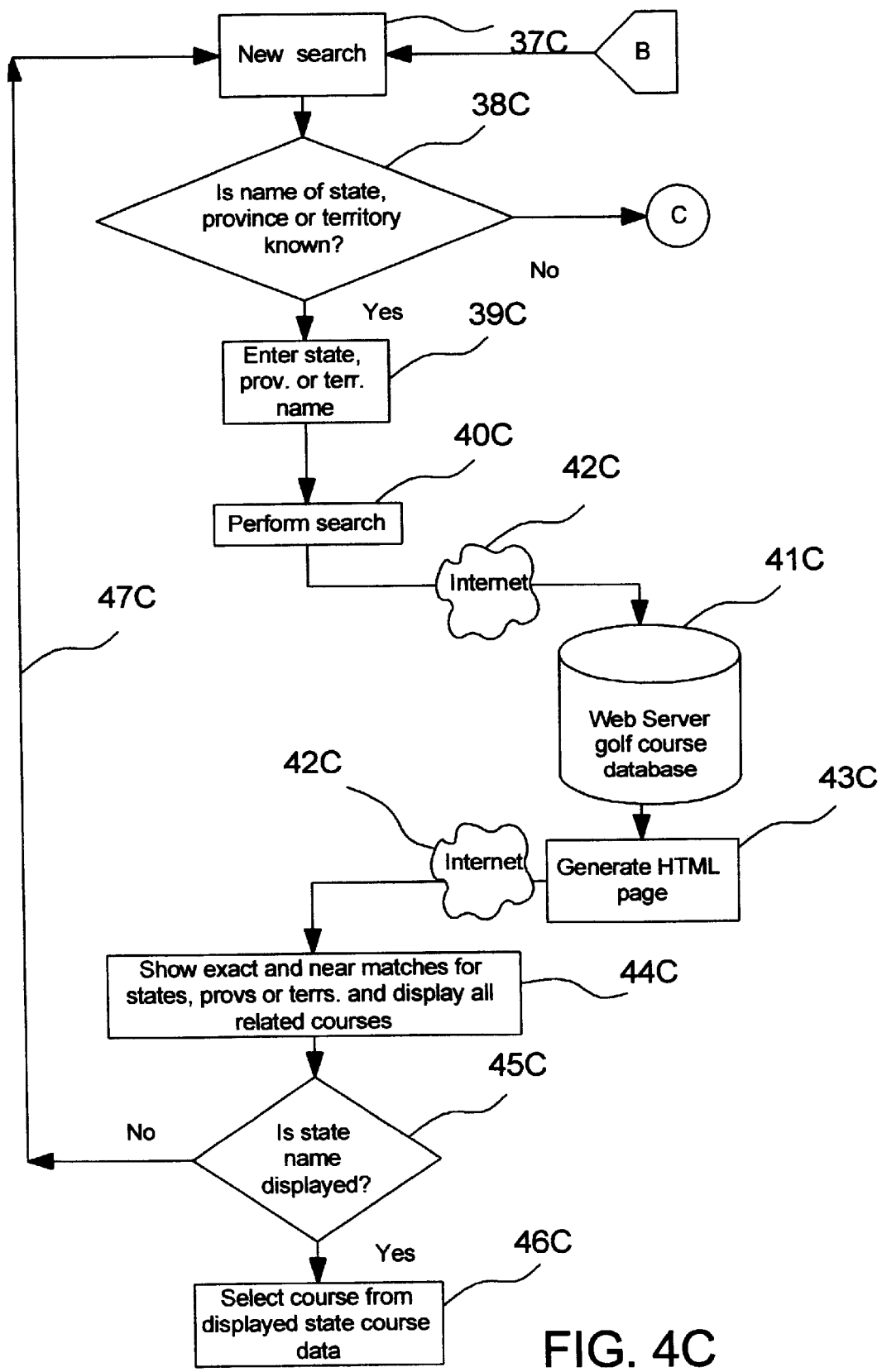
Figure 4D:
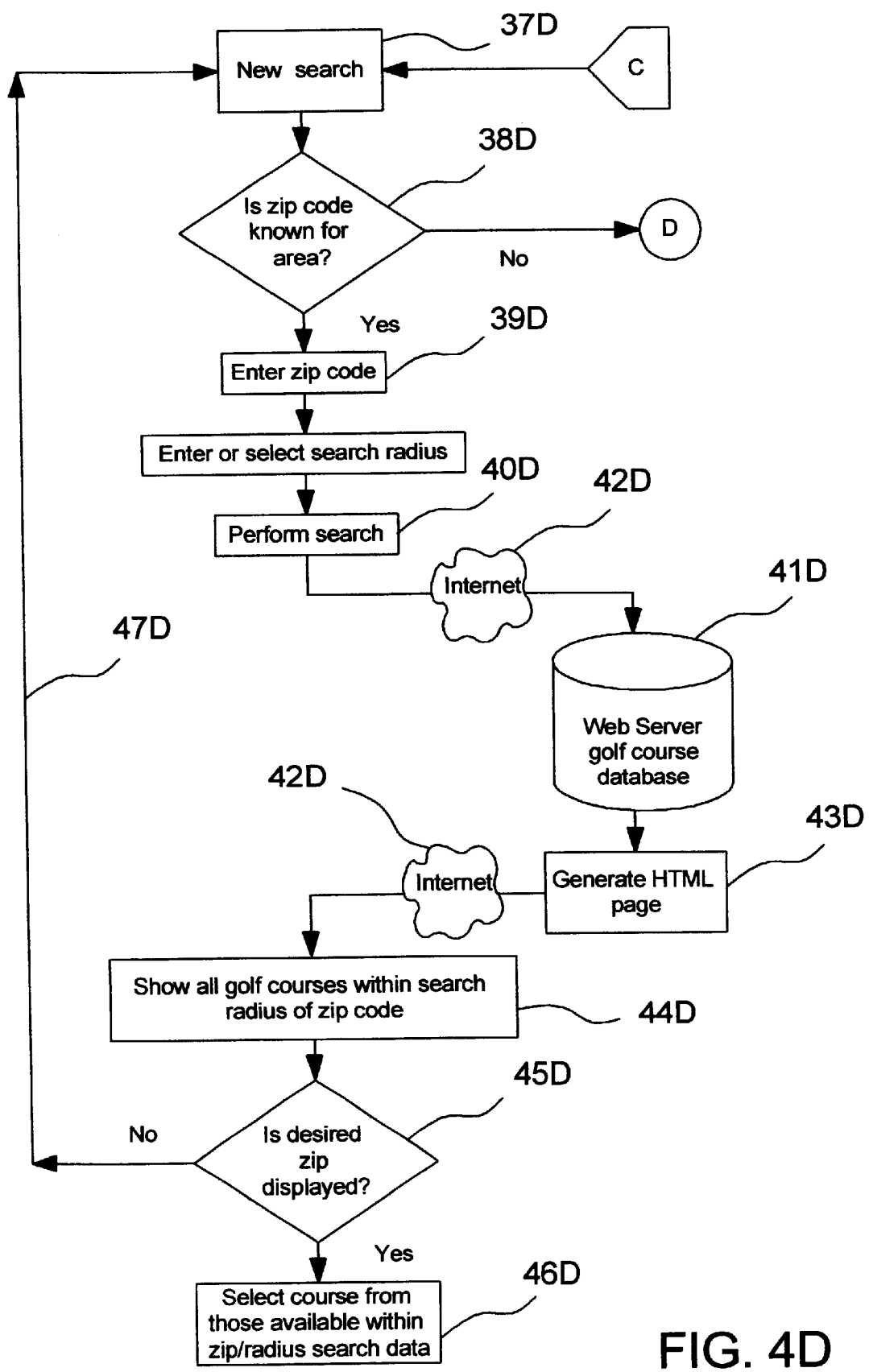
Figure 4E:
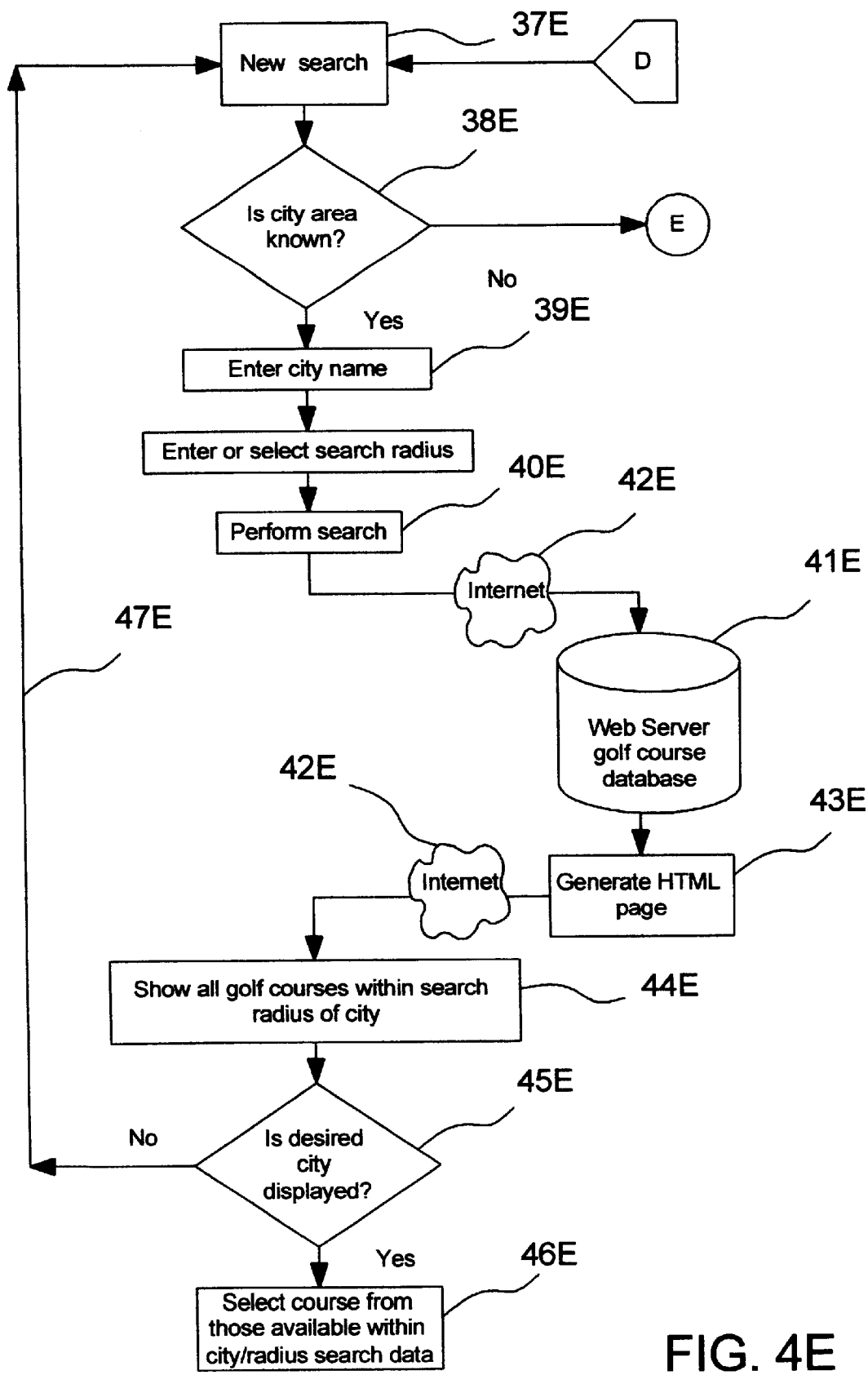

FIG. 3 is a depiction of a golf course mapping process. In this depiction, as an example of a golf course feature to map, a user 25 walks the perimeter 26 of green 27 to construct a vector image display 28 of the actual green 27 in real time on the display 28 of the display module 1A. It should be understood that the following procedure is also used on bunkers, water hazards, fairways, tee boxes and other golf course features. When the software mapping process is started, the current location (Latitude and Longitude (Lat/ Lon)) of the receiver 52 is logged as a new vertex 29 in the RAM of the display module 1A. The vertex 29 is also displayed on the display 28 at the same moment it is logged. Following that, locations or vertexes are logged approximately once per step or pace of the user at a pre-determined time interval (each second is operable).

Each vertex 29 is displayed to the user in real time as a box or dot and is connected with a displayed ray 30 to the preceding logged vertex. As the user 25 traverses the perimeter 26 of the green 27, the accuracy of the position information will vary as a function of, among other things, satellite switching or dropping, differential reception quality and HDOP. Obstacles such as trees 32, hills, buildings and the user's 25 body may block the relatively weak signals 33 from some of the GPS satellites 23. In addition, electrical noise from man-made and natural sources may degrade the AM differential correction signal 36 from the differential correction transmitter 24 as the user moves about the course, mapping features.

The GPS mapping software of the present invention provides the user the ability to move errant vertexes 35 into a position on the display that more correctly represent the perimeter of the course attribute being mapped. This is an opportune time and place to make corrections to the data since the user has just traversed the object and knows its approximate shape. On the display 28 of the Display Module 1A, as a stylus is touched to a vertex 29 and it is dragged to a location that better defines the shape that was just mapped, the attached rays 30 follow. When the stylus is removed from the Display Module 1A, the new vertex location 35A is logged in place of the old one.

To help the user know which vertexes may be errant, each vertex box or dot may be a specific shape or color to represent a confidence level in its respective accuracy. Errant vertexs 35 as depicted in FIG. 3 are sometimes readily identified as not matching the contour of the feature just mapped on the golf course. However, other times it is not clear to the user which vertex needs to be moved.

To aid in this decision, a display module 1A with a color display 28 (depicted in FIG. 1) would display each vertex block or dot 29 with an assigned color indicating the quality of the position information at that vertex. The indicator may be black, green, yellow or red. The color could be based on real time values for differential correction quality, number of satellites tracked and HDOP. However, the color could also be determined by relative differential correction quality, number of satellites tracked and HDOP. In other words, immediately upon completing the mapping of the perimeter 26 of the green 27, the list of data logged for each vertex 29 and 35, including differential correction quality, number of satellites tracked and HDOP, is analyzed and colors assigned to vertexs to indicate which vertexs have the highest confidence level for relative accuracy. For example, if the NMEA GGA data string were logged to the palm-held computer RAM for each vertex 29 and 35 of the green 27 then the GGA data set for the green 27 could be analyzed and colors assigned to each displayed vertex 29 and 35 based on its quality level within the data set. A black block could indicate good quality differential correction, maximum satellites used and a low horizontal dilution of precision (HDOP). A green block could indicate good quality differential correction, a moderate number of satellites used and a moderate horizontal dilution of precision (HDOP). A yellow block could indicate good quality differential correction with moderate age or a moderate number of satellites used and a higher HDOP. A red block could indicate no differential correction or very old differential correction or a low number of satellites used or a high HDOP. A low number of satellites in some cases does not necessarily indicate a degraded location accuracy. However, in a dynamic mapping application where foliage obstruction may block signals from the GPS satellites and cause the number of satellites in use to fluctuate or be substantially reduced, it is important to consider satellite number in deciding which vertex or vertexs to manipulate.

Where Q=Quality, D=Age of Differential, S=# of Satellites in use and H=horizontal dilution of precision (HDOP) and D,S and H are data received from the GGA NMEA string as previously defined, the following formulas may be used to define vertex quality although others may be used as well:

Black if Q=2 AND (S>=7 AND H<=1.5) OR (S=6 AND H<=1.0)

Green if Q=2 AND (S>=7 AND 1.5<H<2.0) OR (S=6 AND 1.0<H<1.5) OR (4<=S<=5 AND H<=1.0)

Yellow if (Q=2 AND D>=6) OR (S>=7 AND H>=2.0) OR (S=6 AND 1.5<H<2.0) OR (4<=S<=5 AND 1.0<H<1.5)

Red if Q=1 OR (S=6 AND H>=2.0) OR (4<=S<=5 AND H>=1.5)

Users of the present invention can create course maps of vector data by traversing and marking areas, lines and/or points on a golf course as explained above. Note that vector data file size may be minimized by logging points along fairway or other relatively straight vectors at greater time intervals, for example, once per 3 seconds. In a preferred embodiment, minimizing the number of logged points representing logged locations is accomplished variously by controlling the rate of logging as a function of speed, bearing or attribute. More points need to be logged when traveling the course at higher speeds or where there are significant and frequent changes in bearing. As opposed to on a time interval, logging may optionally done by setting a logging interval equivalent to distance traversed between points.

Another embodiment maps a reduced number of features in lieu of the entire course. For example, a user may create and submit to a web site a vector-map that includes at least 2 feature perimeter vectors with a maximum spatial separation between greens. In this respect, "maximum spatial separation" means selecting features that are not on adjacent holes but are as far apart from each other as practical. Preferably, rays connecting the three chosen features would approximate an equilateral triangle with the maximum length sides possible for the course. Positioning these vectors with the aid of known Geographic Information System (GIS), software, over a raster aerial or satellite image of the course, and manipulating the submitted map until the 2 or 3 user entered green-area perimeter vectors are in alignment with the image of the course. This will rectify the image to the submitted vector-map. Subsequently, the balance of the fairway, green and bunker vectors could be traced as described below.

In a preferred embodiment, pin locations are mapped as needed and uploaded to the web site or transferred to other palm PCs via the IrDA port or other communications means.

In another embodiment, submeter-pixel, full color, panchromatic or near infrared aerial or satellite images of target golf courses are acquired and rectified to surveyed locations. Rectification can be done with the aid of a laser digital elevation model (DEM) of the golf course. The rectified full color raster image is then usable on a color-compatible palm held computers of the type used as display modules 1A in the present invention. Vectors of each hole feature can be created by tracing features over the top of a displayed aerial or satellite image on a computer graphics workstation. The resulting vector map may be made publicly available on a web-site for downloading into compatible palm held computers. This embodiment would prevent the need for a course to be physically traversed. The rectification process described above will require the use of surveyed data for true ground points.

Another compatible aerial imaging method is to fly at a low altitude and collect multiple images along parallel paths across a golf course until the entire course is imaged. Each time the shutter of the camera is activated a dPGS location is logged. The image and location data is then processed in a GIS where it is mosaiced and automatically georectified as understood in the art. Course features are then traced as described above.

All of the rectification methods above can be completed on a workstation at the web server 4. Alternatively, the individual that gathered the vector data may complete the rectification and course attribute tracing on their home PC II through their browser via the Internet. In this case, an Internet connection is made to the host web server at its Universal Resource Locator (URL), and the user requests access to an image of a local course map. This image would have been previously gathered by aircraft or satellite and placed in a publicly accessible database. Once the image is displayed, the user opens up his own vector data file and displays it over the top of the web page image. The user then manipulates the 2 or 3 green vectors or surveyed points until they lay precisely on the corresponding photographed depiction of the same greens. Upon confirming the match up, the image is rectified and the user can proceed with tracing other course attributes for vector display on the palm dGPS device. Raster to vector and pattern recognition algorithms are also useable to automatically align the photographic image green shapes with the on site collected vector data. The World Wide Web Consortium's Vector Markup Language (VML) can also be employed to edit 2D golf course vectors online.

To improve viewability, color patterns may fill vector area attributes on palm PCs that support color. The grass areas of the course may be displayed in shades of green appropriate for fairways, greens, tee boxes and background areas that are otherwise not designated. Water may be shown as blue, bunkers as tan, cart paths as gray and lines separating each as black.

Elevation Mapping

Although not typically mapped by a user, accurate golf course elevation point data can be tagged with latitude and longitude coordinates and gathered into the inventive unit via any of the following methods:

1) a laser light plane LASERPLANE™ model 1145 and GeoStar™ surveying system receiver manufactured by Spectra-Physics and described in its GeoStar™ Landforming Control System literature# 022482-047, incorporated herein by reference. Laser plane systems such as this can collect relative elevation as accurate as ¼ of an inch. This elevation data collection method would be most appropriate for use on greens.

2) Real Time Kinematic (RTK) GPS; A kinematic survey is completed without having to stop to log GPS positions. For a kinematic survey, a dedicated stationary reference receiver and datalink between it and the roving receiver are required. Once the phase ambiguities have been resolved and continuous carrier phase tracking maintained to at least four satellites, the position of a roving receiver can be computed relative to the fixed reference receiver at each measurement vertex. This may be based on a Kalman filtering scheme that uses double-difference phase data to estimate centimeter-level differential positions as is known. This method would work well on greens and fairways.

3) Laser detection and ranging (LADAR); As an aircraft flies over the golf course a scanning laser fires approximately 4000 pulses per second. The system measures exact distance between the aircraft and the ground every three to five meters by measuring the time it takes for the laser beam to bounce back to the aircraft. The location of the aircraft at each point is precisely recorded by the onboard GPS receiver. The aircraft's attitude, which also influences the accuracy of the calculations, is determined with an inertial measurement system. The result is an elevation map of the golf course with a vertical accuracy of about 6 inches and a horizontal accuracy of about 1 yard. This method could be used on an entire course cost effectively.

4) Photographic digital elevation modeling (DEMs) using aerial or satellite images as well known in the art. The palm held computer executing the Course Player software may interpolate elevation data for its current horizontal latitude and longitude location and cursor target horizontal latitude and longitude location from the elevation data that is gathered in the elevation database above and compute a change in elevation for display to the player. In another embodiment, the elevation data will be combined with the GPS coordinates for the palm device to display 3D graphical elevation views of an almost unlimited variety of selectable target areas for the hole in play, as well as dynamically display numeric changes in elevation between the receiver location and target locations. A preferred embodiment of the Course Player software has the capability of displaying elevations between a current position and a target cursor in real time as the target cursor is moved over the surface of the map.

Internet Web Site Map Exchange Method

This embodiment of the present invention utilizes an on-line public computer network, the most commonly known of which is the Internet.

Figure 2:
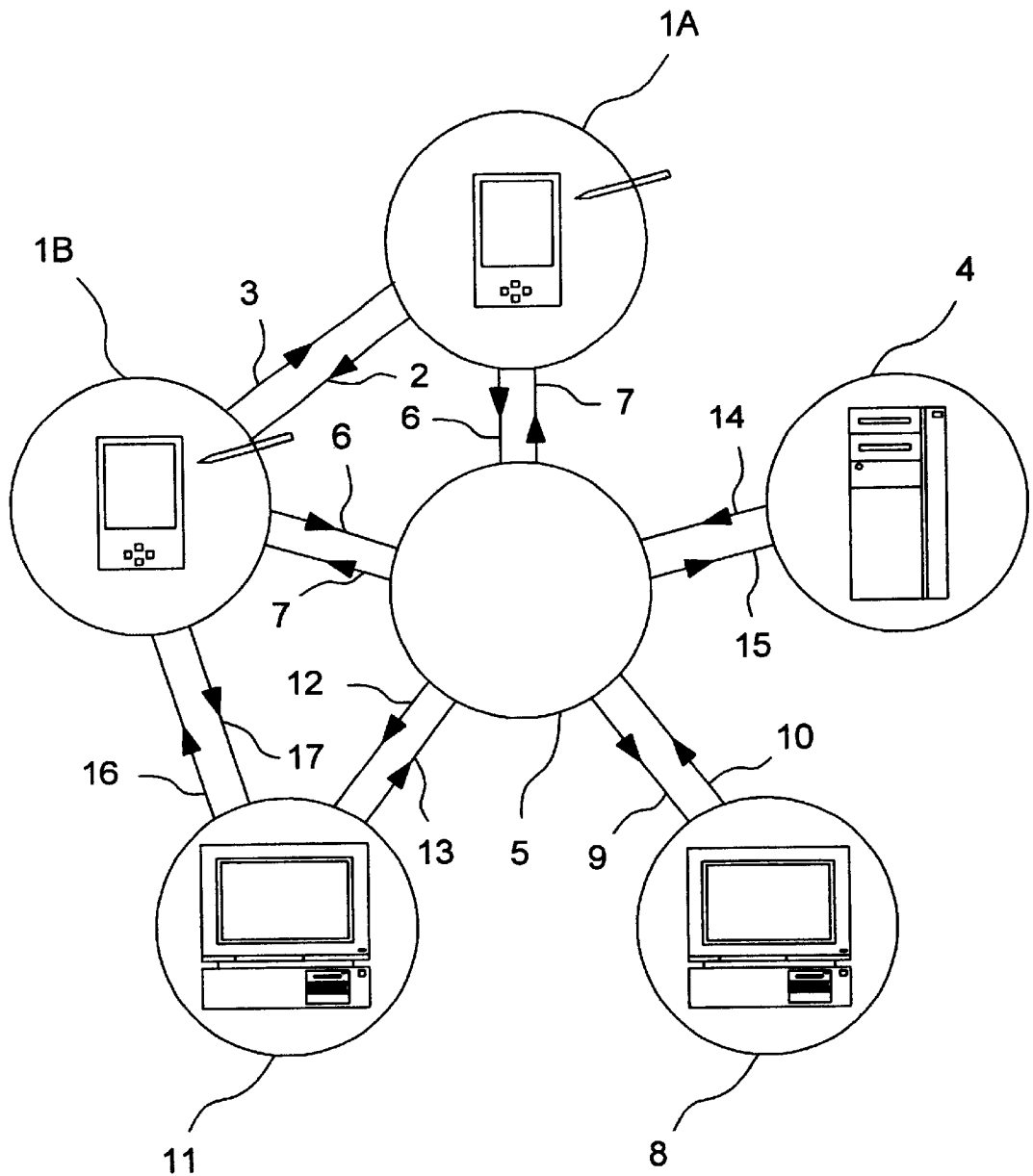
FIG. 2 is a block diagram of an Internet or public network golf course map handling system utilizing the palm-held device of the present invention.

FIG. 1 depicts a palm-held computer 1A which, in one embodiment, is an iPAQ H3650 model palm computer sold by the Compaq Computer Corporation. The computer 1A is used to create or edit maps of golf courses and exchange them with other golfers through an Internet web site. A user may transmit a complete or incomplete map directly to other palm-held computers 1B over a datalink 2 as shown in FIG. 2. The palm-held computer will also receive maps and data over the datalink 3 from other palm-held computers 1B. The palm-held computers 1A and 1B will also collect positional data, including target positions and actual ball lies, which relate to the play of a golf round. The palm computers will exchange data on a pathway that may be a physical link such as an RS232 serial, USB serial, IEEE 1394 serial; a light wave link such as IRDA; a wireless RF link such as Bluetooth or others. The palm computers may transmit collected map and play data to a web server 4 over the Internet 5 or other public access network. A transmission datalink 6 to the internet may include a modem and telephony line or any other switchable connection means, including a wireless packet-data network such as Metricom's Ricochet, Motient, Cellular Digital Packet Data (CDPD) or BellSouth Wireless Data (BSWD), all of which include hardware that may be built into or added as an attachment to the palm-held computer. Other wireless networks such as Wireless Local Area Networks (WLANs) may also be used in a home, office or golf course club house environment. Bluetooth or Jini could also be used to transfer the data onto the Internet. Similarly, the user may browse a company web site hosted on a remote server 4 for a desired golf course map and download the map into the palm-held computer 1A via from the internet by a datalink 7. A workstation 8, through connection 9 to the Internet, receives notification from the web server 4 when a new golf course map is submitted for the database. Quality controlled golf course maps may also be submitted by the company workstation 8 via datalink 10 over the Internet 5 to the web server 4. A desk-top or companion PC 11 (depicted in broken outline) may optionally be used to facilitate synchronizing data with palm-held computers, data storage or communication purposes. The desk-top PC 11 may also connect to the Internet via datalinks 12 and 13 for exchanging map and play data with the company web site. The web server sends and receives information from the Internet by datalinks 14 and 15. The desk top PC 11 also connects to the palm-held computer 1B and communicates with the palm-held computer 1B via datalinks 16 and 17.

In one embodiment, the invention will provide a World Wide Web (www) Internet site where owners of the dGPS golf device of the present invention may transfer golf course maps. As device owners map courses, they can upload them to the site so that other device owners may download them and avoid the need to remap the same course. For a user to download a copy of a golf course map golf system of the present invention, or to view the golf course layout online, the user enters the URL of the web site into their palm held computer browser or desktop computer browser and accesses the company golf course map database through a search engine on the company's host server. A new search is initiated as depicted generally in FIGS. 4A through 4E. If the name of the course is known 38A, it is entered 39A and the search is submitted 40A to the host web server, generally, 41 via the Internet 42. If the course name is not known a different type of search (FIG. 4B through E) may be made with varying search criteria (38B through E) and search results (44B through E). The web server, generally 41, generates an HTML page, generally 43, with the results, generally 44, of the search and returns the information to the requesting PC via the Internet 42 as is well known in the art. If the desired course name is displayed 45, the user selects it to download the appropriate map or display the course layout map 46. If not, another search may be performed, generally 47.

The exchange of user mapped courses will enable multiple user processing and editing to greatly enhance the quality of the maps. Moreover, individual users may add or modify features to existing course maps as they are encountered on a course.

In addition, it is projected that position information gathered while mapping a course can be uploaded to the web site for differential post processing to improve on real-time dGPS-only map quality. The uploaded position data, corresponding satellite data from a nearby CORS reference station and post processing software may be used to fix vertexs or points that may have been recorded with old differential real-time data or no differential data.

Course maps may be organized in a server database progressively by: Continent; Country; State, Province, or Territory; City; Course Name. The following map and position data may be available to be exchanged for each course:

| Pin Placements | Mapped Date | Mapper's Name |
| Vector Map | Mapped Date | Mapper's Name |
| Raster Map | Mapped Date | Mapper's Name |

Map data files may also include typical score card data such as hole data including yardage, rating, slope information, par, handicap and other course data such as course name, phone number, address and amenities.

The web site will further provide users with the ability to upload play data. Various graphical statistics programs will use the play data for display of performance parameters including, but not limited to:
Off target shots by club, direction and distance
Club distance averages by type of lie and target distance
Graphical display of course with ball lie locations that produce lowest scores and clubs used from all submitted play data
Graphical display of drive locations by hole for multiple games
Out of bounds or hazards most frequented, by hole.
All of the data sets may be viewed for: submitting player, left hand players, right hand players all players, etc. Once play data is uploaded, a browser-based executable (for example, a Java applet or Shockwave movie) may be run to depict replay of a round with speed and various other parameters of replay being adjustable. Aerial or satellite full color images or the uploaded vector map may be used as background for the replay.

The web site may also provide automatic e-mail notification of both scheduled and unscheduled marine beacon transmitter outages. The user can select, from a list presented on the web site, which transmitter location outages should generate an automatic e-mail outage message.

The web site may host a player provided rating system for rating mapped courses based on various criteria including, but not limited to, course condition—greens, fairways, drainage etc.; and course design—fairway width, difficult water, quantity and quality of bunkers; green size etc. The criteria listed here are only examples and are not all-inclusive. These user provided input will provide the web site with a constantly evolving content to encourage continuing return visits.

Course Mapper Software

The Course Mapper software package utilizes a Graphical User Interface (GUI) and touch sensitive screen such as those of the display 28 of the display module 1A. The mapping task can occur with any combination of walking, golf cart driving or golf bag cart pulling or pushing as previously explained. Each item mapped shall be labeled by selecting from a standard set of labels. Additional explanatory data may be added to each mapped item.

When the display module 1A is turned on, the last course mapped is displayed. The orientation of the displayed vectors of the map shall be north toward the top of the display. Appropriate dialog boxes shall be implemented for the OS running. Because most holes on a golf course are long and narrow, the location of the touch sensitive menu buttons is thus preferably along the side of the display. On the Windows CE OS there may be no standard File/Edit/View menu bar at the top so as to avail limiting the course map display area.

Figure 5:
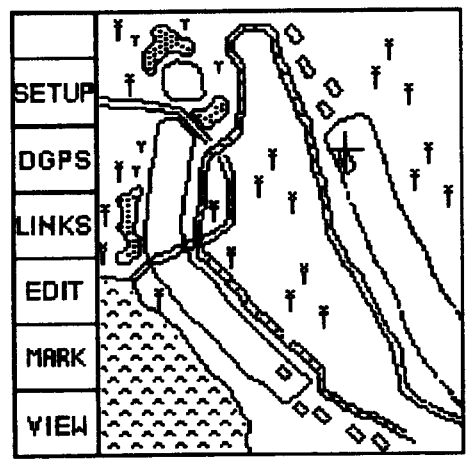
FIG. 5 is a representative initial image shown on the viewing display during operation of the course mapper software.

Referring now to FIG. 5 (which depicts the approximate size and resolution on a Palm III PDA), depicted is a representative image on the display 28 of the display module 1A when course mapping. The majority of the screen shows a graphic representation of the course area being viewed termed the map area, and the left side of the screen shows a vertical menu column of touch sensitive, labeled menu buttons. The menu column displayed in FIG. 5 is the common start menu column.

The left side vertical menu column of labeled menu buttons will be a repeating aspect of the following software operations with the content of the labels and the actions which result from pressing a given labeled menu button differing as described following. In the following figures will be depictions of one or more side by side vertical menu columns of labeled menu buttons, separated by vertical spaces. The side by side vertical menu columns indicate a progression of menu buttons displayed, one menu column at a time, starting from the left most menu column and proceeding to the right. Where, in one depicted menu column, a particular menu button is depicted as double-bordered, the double-border indicates that the pressing of that button in that menu column will then cause the display to show the next most menu column to the right in that Figure.

In FIGS. 12, 20, 21, 23, and 27, the displayed image(s) include a table comprised of more than one menu column in continuous contact without vertical spacing between them. When multiple menu columns without vertical separations forming a table are shown, the entire table will be displayed at once upon the pressing of the double-bordered button. Where a table is shown separated by a vertical space from a menu column with a double-bordered menu button to the left of the table, the pressing of the double-bordered menu button causes the display to switch from showing the menu column to showing the table. The headings at the top of the menu columns are for reference only, and refer to the double-bordered menu button pressed immediately before that column was displayed. These menu buttons are described as follows:

Setup

Figure 6:
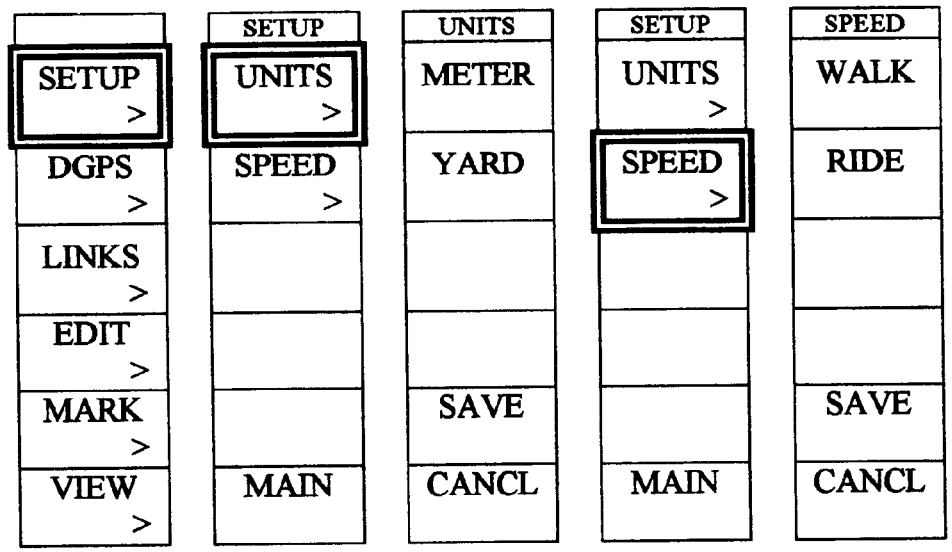
FIG. 6 shows a progression of left menu columns following an initial pressing of SETUP on the viewing display during course mapping.

In FIG. 5, Setup will be used to set mapping parameters that will be changed infrequently as further defined in FIG. 6.

Referring now to FIG. 6:

When "Setup" is pressed a new menu column shall be displayed in place of the original menu column. The term at the top of a menu column depicted is the term pressed on the previous menu column which displayed the current menu column.

Units

Displays the selection of the preferred units of measure. For English US, the distance is to be displayed in yards. For metric, the distance is to be displayed in meters.

Speed

Figures 15, 16:
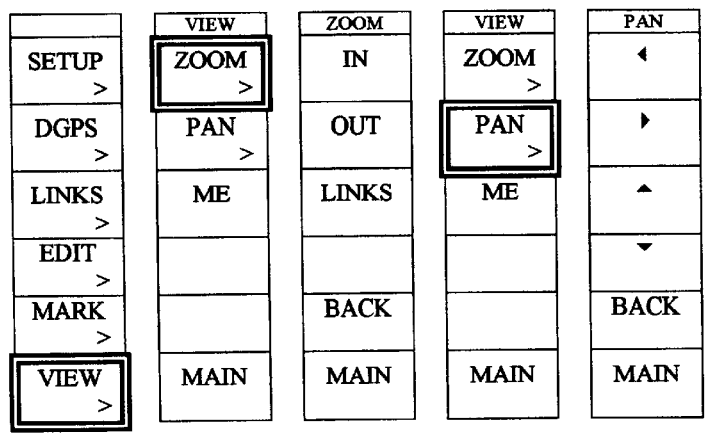
FIG. 15 is a golf course feature table showing relative depiction qualities, associations and mapping log rates of features in the mapping software of the present invention.
FIG. 16 shows a progression of left menu columns following an initial pressing of VIEW and subsequently pressings of ZOOM and PAN on the viewing display during course mapping.

Indicates to the system the rate at which position information vertexes are taken during the mapping of the course. This may be accomplished by permitting the selection of the preferred mapping method for riding a powered cart (5–10 mph) or walking (1–3 mph) according to the mapping log rate table (FIG. 15).

Main

See common components below.

dGPS

See common components below.

Figure 7:
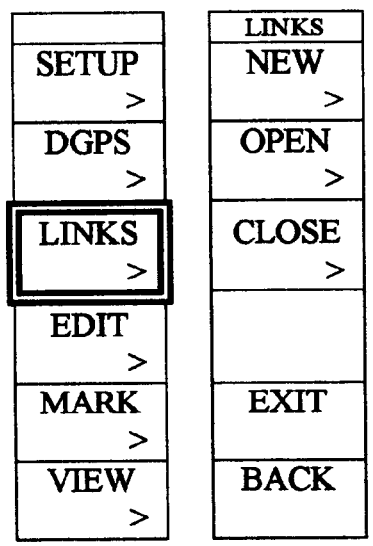
FIG. 7 shows a progression of left menu columns following an initial pressing of LINKS on the viewing display during course mapping.

Referring now to FIG. 7:

Links

To begin a mapping operation, either a new course must be created or an existing one opened.

Map New Course

"New" shall allow the creation of a new course map when a position module is attached. A dialog box shall be displayed to facilitate naming of the course, entering hole par strokes, handicap and tee colors and their respective yardages.

Open Existing Course

Open shall allow the user to open and edit a previously created or downloaded course map. The opened course need not be reopened after a power down/up cycle of the display module 1A. A dialog box shall be displayed to facilitate selection from a list of existing course names.

Close Current Course

Close shall allow the user to close the current course so another may be opened or created.

Exit

Exits the Course Mapper Program.

Back

See common components below.

Figure 8:
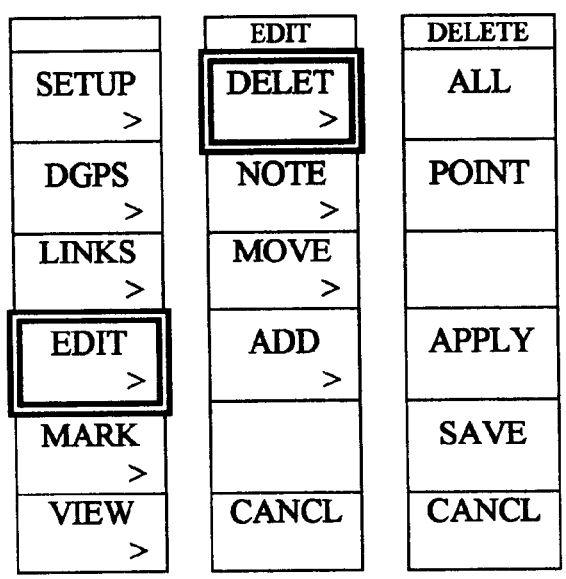
FIG. 8 shows a progression of left menu columns following an initial pressing of EDIT on the viewing display during course mapping.

Referring now to FIG. 8:

Edit

Edit is used to modify features of an existing map. After edit is pressed and the next dialog displayed, the user will be prompted to select a feature to edit. A tap of a stylus on the display locates the nearest feature. A small, unfilled, $2^{nd}$ box will be displayed at each position vertex to indicate which attribute was chosen. The box shall be large enough for the stylus to pick it. If "Delete", "Note", "Move" or "Add" is pressed before an attribute is selected, a dialog box, with an "OK" button, will appear to instruct the user to select an attribute. The "Delete", "Note", "Move" and "Add" buttons shall not function until an attribute has been selected. While these buttons are displayed each touch of the stylus on the map area shall either select a feature or, if one is already selected, toggle it off and select another. The toggled off feature may not be reselectable immediately after it is toggled off. Once the correct feature is selected, the user selects the type of edit to perform.

Delete

For an entire attribute deletion ("All") a confirmation window stating the pending action shall be displayed with a confirming "Yes" or "No" selection required. The user must select a vertex to be deleted with the stylus before the "Point" button will work. If "Point" is pressed and no point to be deleted has been selected, the user is prompted to do so. A selected vertex shall change from an unfilled $2^{nd}$ box to a filled box when it is selected. Retouching it will deselect it. Further relevant description may be found under the common components section following the "Apply", "Save" and "Cancel" items.

Figure 9:
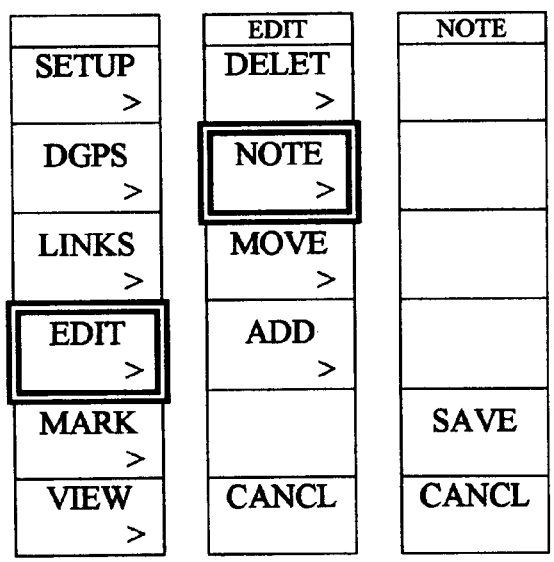
FIG. 9 shows a progression of left menu columns following an initial pressing of EDIT and subsequently a pressing of NOTE on the viewing display during course mapping.

Referring now to FIG. 9:

Note

If "Note" is selected a dialog box shall be displayed that will allow the use of the display module's text editor to modify the note.

Figure 10:
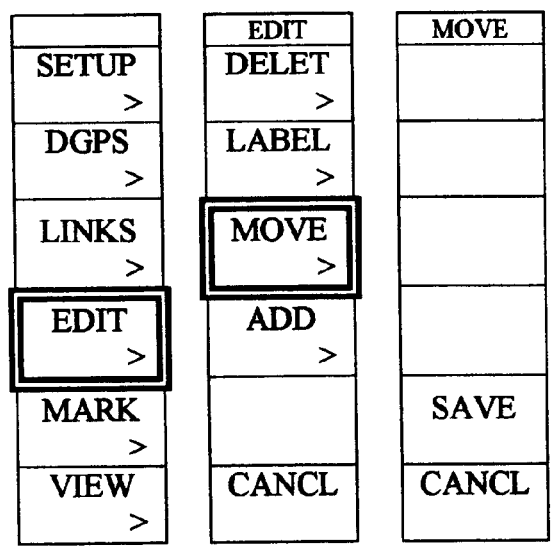
FIG. 10 shows a progression of left menu columns following an initial pressing of EDIT and subsequently a pressing of MOVE on the viewing display during course mapping.

Referring now to FIG. 10:

Move

After "Move" is selected the stylus may be placed in a vertex and that box dragged to a new location. As a stylus is touched to the vertex and it is dragged to a location that better defines the shape that was mapped, the attached rays follow as previously described. When the stylus is removed, the new vertex location is logged in place of the old one. "Cancel" or "Save" finishes the move edit.

Figures 11, 12:
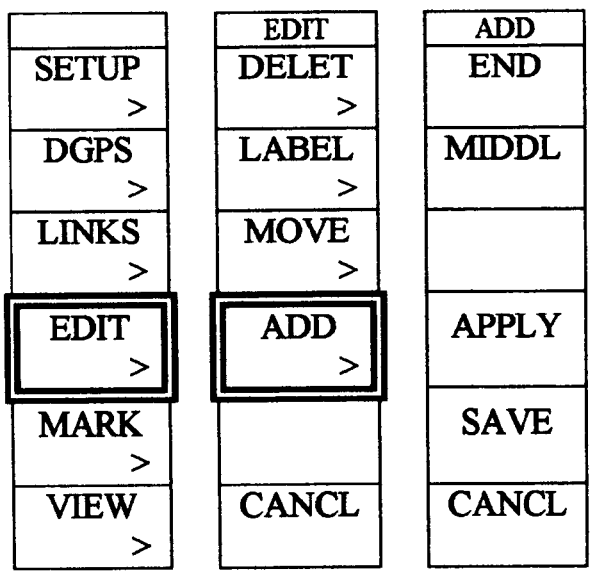
FIG. 11 shows a progression of left menu columns following an initial pressing of EDIT and subsequently a pressing of ADD on the viewing display during course mapping.
FIG. 12 shows a Table displayed on the viewing display following an initial pressing of MARK on the viewing display during course mapping.

Referring now to FIG. 11:

Add

When add is selected, the stylus may be used to add a point to an existing line or area that was selected after "EDIT" was pressed. The system shall set a point where the user touches the display with the stylus near the end of a line or the middle of a line. If "END" or "MIDDL" is pressed before a point is set, a dialog box with an "OK" button, will appear to instruct the user to set a point. After the point is set, the system shall accept the "END" or "MIDDL" button entry. If "END" is selected, the system will prompt the user to pick the vertex that indicates the end of the line to add the point to. If "MIDDL"" is selected the system will prompt the user to pick the two vertexes that the new point is to be placed between.

Referring now to FIG. 12:

Mark

The mark function is used to map golf course attributes by walking or riding around their perimeter as previously described. When "Mark" is selected, to facilitate mapping of a feature, that feature is displayed in real-time to facilitate quality control for the user.

When the "MARK" function is selected, a list of all the possible types of marks, corresponding to the various features are displayed in a singular dialog box (Righthand table in FIG. 12). After a mark type is selected and, when appropriate, the associated hole number identified, a "BEGIN" dialog is displayed.

Figure 13:
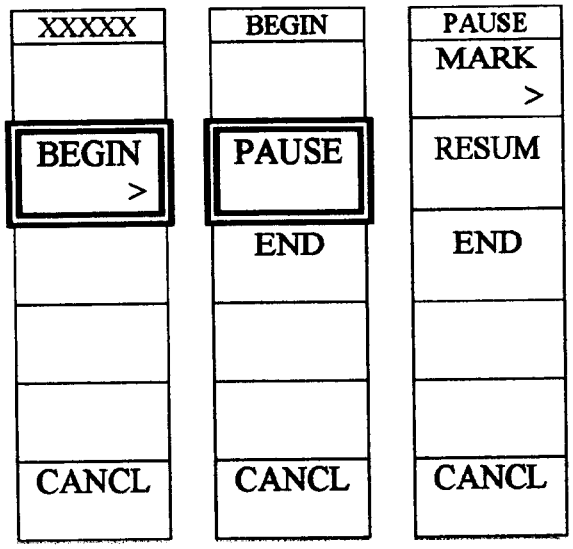
FIG. 13 shows a progression of left menu columns displayed on the viewing device following an initial pressing of any key in the table of FIG. 12, represented by XXXX, which is not in the column headed A/L/Pt.

Referring now to FIG. 13:

When "BEGIN" is pressed position data will immediately start to be stored in RAM at the rate defined for that mark type, see FIG. 15.

Connected line segments (rays) enclosing an area will be created from the series of consecutively collected positions. Additionally, points or lines not defining an area may also be created from the positions, as appropriate. The user shall avoid, if possible, beginning the mapping of an area at or near a corner or on a sharp curve.

After the mark type is selected, the mark type table FIG. 12, is no longer displayed. The selected mark type is displayed to the user and the "BEGIN"/"CANCL" menu box is displayed. For appropriate mark types, the user is prompted to enter the respective hole number the mark is to be associated with.

Figure 14:
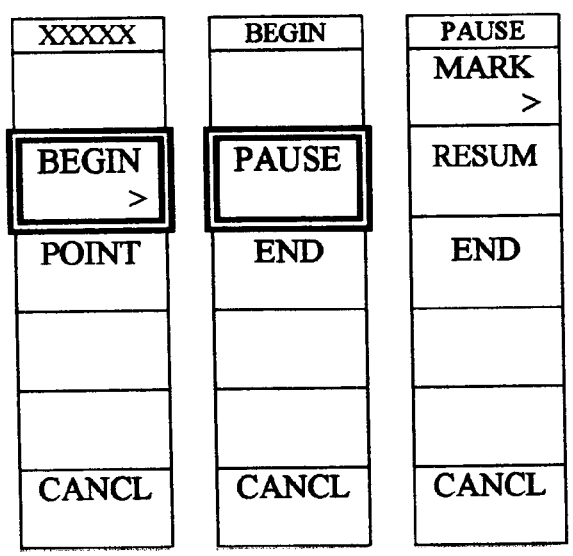
FIG. 14 shows a progression of left menu columns displayed on the viewing device following an initial pressing of any key, represented by XXXX, in the column headed A/L/Pt of the table of FIG. 12.

Referring now to FIG. 14:

The menu of FIG. 14 is displayed if Tree, Bush, Rock or Other is selected from the feature table of FIG. 12. The "Point" button is pressed if the user wishes to mark the point location of a single entity and "Begin" to start the process of marking an area or line of the chosen attribute.

Begin

After "Begin" is pressed a dialog box will be displayed that may include the following message: "A (Mark Type) (s) location is being logged while (Walking or Riding)." Also, after "Begin" is pressed an "End" button shall be added to the menu to allow the user to indicate when she is within one or two steps of returning to the original starting point of an area feature being mapped or to terminate a linear feature being mapped. When "Begin" is pressed, the system immediately begins logging the GPS locational data from the serial port at the predetermined rate. The positional data is logged until the "Pause" or "End" button is pressed.

Point

When "Point" is pressed the current location is logged. Immediately following this, the user is prompted for a note to define the point.

End

The user should press the End button as she nears the original start point of an area or the end of a line. When "End" is pressed, the user is prompted for a note to be added about that feature.

Pause/Resume

When "Pause" is pressed, the user temporarily suspends marking of the current feature and an intermediate "Mark" menu button and "Resume" button is displayed. The user may then press "Resume" when ready to begin mapping that feature again or lay down a physical marker of some type on the course to facilitate the return and continuation of mapping later.

Nested "Mark"

The Nested "Mark" button is shown in the rightmost column of FIG. 14, second button from the top. When selected, the user is allowed to mark another feature in the same physical portion of the course as the original feature being marked. The user presses "Mark" on the "Pause" menu list and proceeds to mark the second feature with full main menu "Mark" capabilities. The user may then, press "Resume" and continue on with the mapping of the original feature. Only one level of nested marking may be permitted.

Referring now to FIG. 15:

For several of the course features the system shall prompt the user to indicate if the just completed mapping of a feature is an enclosed area or a line. FIG. 15 is a chart showing the various options available to a user for the various features. A feature's edge may be mapped as a line in lieu of traversing the complete feature to map it as an area. Moving the unit along the edge of a feature marks the feature's edge. A line feature is any marked feature where the user does not return to the original starting point to create an enclosed area. A line, for instance, could be the edge of a forest or lake or simply along the center of a cart path.

Hole Association

Hole association, included in the table of FIG. 15, will be a selection that the user makes to let the system know which hole or holes a feature is associated with. This selection shall determine if the feature is displayed in that particular hole view. Some features must have at least one hole association; indicated by an X. In the features in the table designated with an O, association is optional, but not required. If the feature is not associated with a hole or holes it will be displayed in all views. All features may be associated with multiple holes. The selectable features may include:

Tee Box

When "Tee" is selected, the system shall label the data to be logged in the map file with a unique identifier for a tee box. Throughout the system, tee data is treated as an area. The system shall also prompt the user to enter the hole number for the tee box. It then advances to the next menu. After "End" is pressed, a note may be added. The systems shall permit multiple tee boxes areas per hole.

Fairway

When "Fairway" is selected, the system shall label the data to be logged in the map file with a unique identifier for a fairway. Throughout the system, fairway data is treated as an area or areas. The system shall also prompt the user to enter the hole number for the fairway. It then advances to the next menu. After "End" is pressed and a note added, the user is prompted to mark a reference point for the normal line of play through the center of the fairway. This reference point is used in Course Player for the computation of the three displayed distances. For perfectly straight holes and par 3s, no reference pointed is needed. For doglegs, the reference point is set in the fairway, midway from each side, at the dogleg. The system may permit multiple, separate fairway areas per hole.

Green

When "Green" is selected, the system shall label the data to be logged in the map file with a unique identifier for a green. Throughout the system green data is treated as an area. The system shall also prompt the user to enter the hole number for the green. It then advances to the next menu. The system shall only permit one green to be mapped per hole.

Hole

The area defined as the hole may be fictitious or real and encompasses the tee boxes, fairway, some bunkers and the green in their entirety. When "Hole" is selected the system shall label the data to be logged in the map file with a unique identifier for a hole. Throughout the system, hole data is treated as an area. The system may also prompt the user to enter the hole number for the hole and then advance to the next menu. The system shall only permit one hole to be mapped per hole number.

Bunker

When "Bunkr" is selected, the system shall label the data to be logged in the map file with a unique identifier for a bunker. It then advances to the next menu. After "End" is pressed, a note may be added. A bunker is to be mapped such that the first logged point is at the front of the bunker.

Rough

When "Rough" is selected, the system shall label the data to be logged in the map file with a unique identifier for a rough. It then advances to the next menu. After "End" is pressed, a note may be added.

Water

When "Water" is selected, the system shall label the data to be logged in the map file with a unique identifier for water. It then advances to the next menu. After "End" is pressed, a note may be added.

Tree/Bush/Rock

When one of these attributes is selected, the system shall label the data to be logged in the map file with a unique identifier for it. It then advances to the next menu. After "End" is pressed, a note may be added. These attributes may be logged as an area, line or single item (point).

Mound

A circle depicts the contour of a mound.

Cart Path

When "Path" is selected, the system shall label the data to be logged in the map file with a unique identifier for a cart path. It then advances to the next menu. "End" is pressed to complete the path mark. Notes are not added for paths. Moving the GPS antenna along the center of the path is the method used for marking a cart path.

Out of Bounds

When "OB" is selected, the system shall label the data to be logged in the map file with a unique identifier for Out of Bounds. It then advances to the next menu. After "End" is pressed a note may be added. The out-of-bounds portions may be mapped by moving along out-of-bound markers at the edge of the area that is potentially effected.

Flag or Pin

A graphic flag as shown in FIG. 29.

Ditch

When "Ditch" is selected the system shall label the data to be logged in the map file with a unique identifier for a ditch. It then advances to the next menu. After "End" is pressed a note may be added. A narrow ditch may be mapped with one line by moving the antenna along the bottom center of the ditch. A wide ditch may be mapped by moving along each side of the ditch and creating two somewhat parallel lines.

Center of Green

When "CoG" is selected the GPS location available at the serial port is labeled and logged in the map file with a unique identifier for the center of a green. After "CoG" is pressed the user is prompted to enter the hole number and a note. The center of green is used in Course Player for the computation of distance between the target cursor and the green if "center of green" is selected in setup for the green reference point.

Front of Green

When "FoG" is selected the GPS location available at the serial port is labeled and logged in the map file with a unique identifier for the front of a green. After "FoG" is pressed the user is prompted to enter the hole number and a note. The front of green is used in Course Player for the computation of distance between the target cursor and the green if "front of green" is selected in setup for the green reference point.

Pin

The frequency of marking pin placements will be much greater than that of marking any other attribute. Also, users will want to download pin placements from other palm PCs and our web site without altering other map data. Because of this it is necessary to have an independent file that is pin location specific and tagged by date. The file may be identified as course_name.pin When "Pin" is selected, the location available at the serial port is logged as that pin location. After "Pin" is pressed the user is prompted to enter the hole number and a note. If "Pin" is selected in Course Player setup for the green reference point, the pin placement is used for the computation of distance between the target cursor and the green. Only one pin location may be mapped per hole.

Users may receive updated pin locations from another display module 1A via any transition method suitable for communication between such units. Optionally, a course itself may upload new pin locations to the Web Site with a date and time estimate for the new hole location changes. Thus, the data is directly available to golfers at the club house with their display module 1A.

Referring now to FIG. 16:

View

View will allow the user to better display a particular portion of the course being mapped. At the beginning of the mapping process there will be no vectors to zoom or pan.

Zoom

The system has the capability of displaying and zooming the current map or portion of a map while on the golf course. The left most physical button may zoom out and the right most physical button may zoom in. Pressing and holding the zoom buttons will zoom the display at an increasing rate. For Course Mapper, all zoom views are north up.

In

Pressing "In" shall zoom in on the displayed map. All features become twice as large each time the in button is pressed. The system shall zoom in to the point that at least one point of a vector is displayed. The center of the map remains the center after zoom in.

Out

Pressing "Out" shall zoom out on the displayed map. All features become half as large each time the out button is pressed. Maximum zoom-in will be approximately 8 pixels per foot for most display modules 1A. The maximum zoom-out shall be what ever it takes to display all mapped attributes for the selected course. The center of the map remains the center after zoom out.

Links

When "Links" is pressed the map of the entire course shall be displayed. At full course zoom and only at full course zoom a hole number shall be placed on top of each hole with pixels cleared out around each number for uncluttered viewing of the number.

Back

See common components following.

Main

See common components following.

Pan

A physical rocker switch on the display module 1A may also pan the displayed image, for example, at a rate of 1 pixel per press in the direction it is rocked up or down. Pressing and holding the rocker will pan the display at an increasing rate. Redraw capabilities of the display module 1A will determine the maximum pan speed. Each physical button to the immediate left and right of the rocker shall also serve the same capability for panning left and right respectively.◄

This menu button shall move the displayed map to the left each time it is pressed.►

This menu button shall move the displayed map to the right each time it is pressed. ▲

This menu button shall move the displayed map up each time it is pressed. ▼

This menu button shall move the displayed map down each time it is pressed.

Back

See common components following.

Main

See common components following.

Me

Pressing "Me" shall shift the map to place the receiver current location in the center of the display without changing zoom level.

Main

See common components following.

Data Transfer

When the sync function of the display module 1A is activated, the Course Mapper software shall facilitate uploading of all course data to a Personal Computer for use in a PC Instant Replay program to the web site.

Methods of Software Implemented Golf Course Play

Following is a detailed description of the operation of a preferred embodiment of the Course Player Software embodying the inventive methods of golf course play:

Introduction

The Course Player software implements the inventive methods in three levels of capabilities in the display module 1A. Level 1 includes the Course Player software and supplied course data only. Level 1 requires the user to identify and mark his or her location on the hole by visual reference. This level does not allow users to map their own courses. Course data must be created and supplied by others.

Adding a position module 17 receiver to the Level 1 system enables Level 2 capabilities. The Course Player software in the Level 1 version already has all the capabilities for interaction with the position module 17 for creating or editing their own course maps. Level 2 also allows users to upload mapped courses to the Web site for use by other users.

All dialog boxes used during hole play may make use of buttons and lists that appear as needed on the display 28 of the display module 1A large enough that a stylus is not needed during the normal course of play, only a finger.

Before going onto a golf course for the first time to play a round of golf, the user will have to load a file containing vector and attribute data for that course. The course data may be loaded by connecting to a PC or directly to the Internet web site. The course data will be stored in nonvolatile RAM or a removable RAM data card. When the system is turned on the previous game play-state is resumed.

Figure 17:
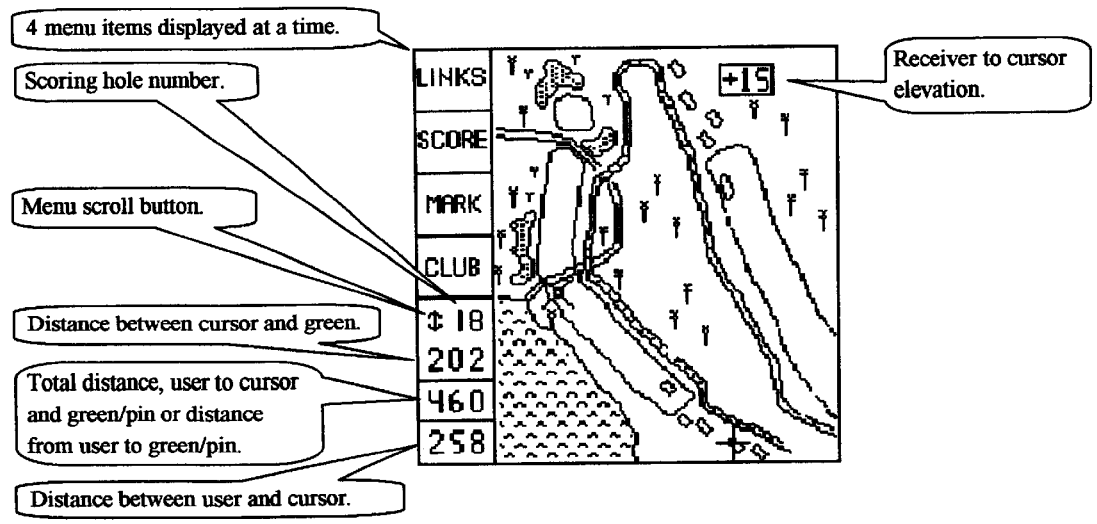
FIG. 17 is a representative initial image shown on the viewing display during operation of the course player software, with added explanations (not depicted on the viewing display when in operation) of the contents of the display.

Referring now to FIG. 17:

Depicted is an image that will be seen at a general initial state of use of the Course Player software. The left side of the screen contains menu buttons and information pertaining to the depicted image as detailed in FIG. 17.

In the following Figures, the menu buttons depicted with soft wavy borders are not shown during normal play. until they are scrolled to, due to the space limitations of the display screen. A scroll button is used to advance the menu list up or down. As previously, a double border line, straight or wavy, indicates the next menu column to the right is shown when the button with a double bordered line is pressed.

Figure 18:
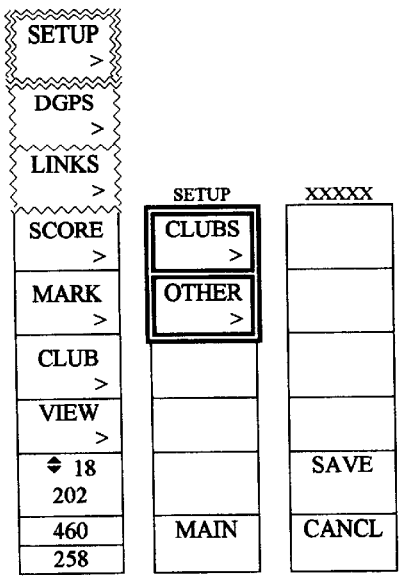
FIG. 18 shows a progression of left menu columns following an initial pressing of SETUP and subsequently pressings of CLUBS and OTHER on the viewing display during operation of the course player software.

Referring now to FIG. 18:

Setup

Setup will be used to set player preferences. It is placed at the top of the menu list in anticipation of little use. The squiggly button boundaries indicate the menu items are, for this menu implementation, scrolled off the top of the display 28 and are not visible during normal play.

If "Setup" is pressed, the setup columns menu as shown in FIG. 18 shall be displayed in place of the main menu.

Clubs

If "Clubs" is pressed the "Save"/"Cancl" menu is displayed and a dialog will be presented that allows the user to pick up to 20 clubs that she wishes to gather stroke data on and to select the 14 current clubs that will display in the pick list for play. An entry shall also be made available to erase/reset the club stroke database. It shall include a warning and confirmation window before erasure.

Others

Figures 19, 20:
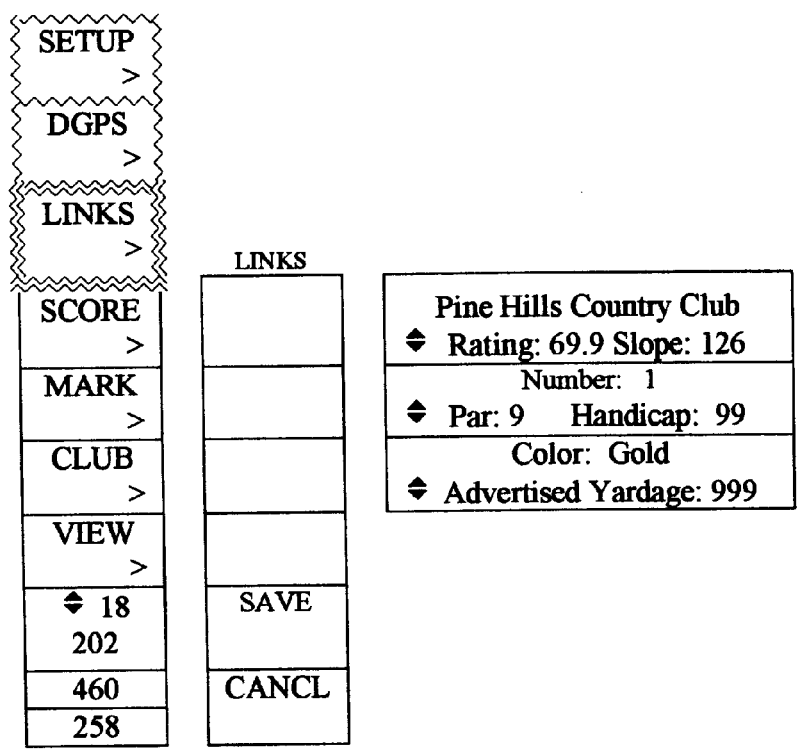
FIG. 19 shows a dialog box of options to be selected in the setup procedure of the course mapper software.
FIG. 20 shows a left menu column and table shown on the viewing display following an initial pressing of LINKS during operation of the course player software.

If "Other" is pressed the "Save"/"Cancl" menu is displayed and a dialog box shall display FIG. 19.

Referring now to FIG. 19:

Mark Green Strokes

If this check box is marked "Yes", the user will mark every lie and stroke of the game until it is changed to "No." The appropriate score card entry for strokes will be automatically incremented when a lie is marked. If checked "No", then the user will manually enter the number of putts under "Score".

Green Reference Point

The green reference point shall be used for the computation of distance between the selected green reference point and the target cursor.

System Units

This item shall allow the selection of the preferred displayed units of measure. For English US; the distance shall be displayed in whole yards. If any displayed distance drops below 10 yards the distance is then displayed in feet with a "F" added to the end of the number i.e. 25 F. For metric, the distance shall be displayed in meters. If any displayed distance drops below 10 meters the distance is then displayed in tenths of meters i.e. 9.5.

Cursor Ghost Lines

This setup feature shall allow the cursor ghost lines to be either displayed or not displayed. The cursor ghost line connects the current ball position, the target cursor and the green reference point.

Display Elevation Window

If this box is checked yes, the Elevation Window on the map will be displayed. If this box is checked no, the Elevation Window will not be displayed.

Default Target Cursor Distance

A provision shall be made to allow the user to set the default target cursor location when the next hole is displayed. The default target cursor location is "x" number of yards along the line connecting the front of the tee box and the fairway normal line of play reference point. If the default target cursor location is beyond the green location selected in setup, then the distance to the green location becomes the default target cursor distance. The entry field shall contain 3 digits with the entry units of yards or meters. Min and Max limits (0-999) will be used to validate entry data. The user shall have the capability of modifying this value without the use of a stylus.

Referring again to FIG. 18:

Main

See common components following.

dGPS

See common components following.

Referring now to FIG. 20:

Links

Pressing the LINKS button shall allow the user to select courses and present factual information for the selected course and hole. The user will be allowed to select the course, tee box color to play and beginning hole of play. After doing so, the full view of that hole shall be displayed. The green shall always be located toward the top of the display with the tee boxes being toward the bottom. The links column and course data column of FIG. 20 display simultaneously.

Each of the scroll buttons in the right vertical column of FIG. 20 will automatically scroll with increasing scroll speed if it is held down. Each press will step one line through the data in each field. The data will loop continuously when the button is pressed and held down.

Course Names

This button shall display a name for each course loaded into the display module 1A either in RAM Flash Card or other memory storage system. The rating and slope for the selected tee box is displayed under the Course Name. The respective rating and slope for each tee box is displayed as the tee box selection below is changed.

Hole Information

This button shall display the number of par strokes and the handicap for each hole on the displayed course. If "Save" is selected the displayed hole shall become the hole in play. This allows the user to select the beginning hole of play or play the course out of order.

Tee Box Information

This button shall display the tee box designation and the advertised yardage associated with it for each hole on the displayed course. If "Save" is selected the currently displayed tee box color shall be used throughout the round unless changed and saved.

Save

See common components following

Cancel

See common components following

Figure 21:
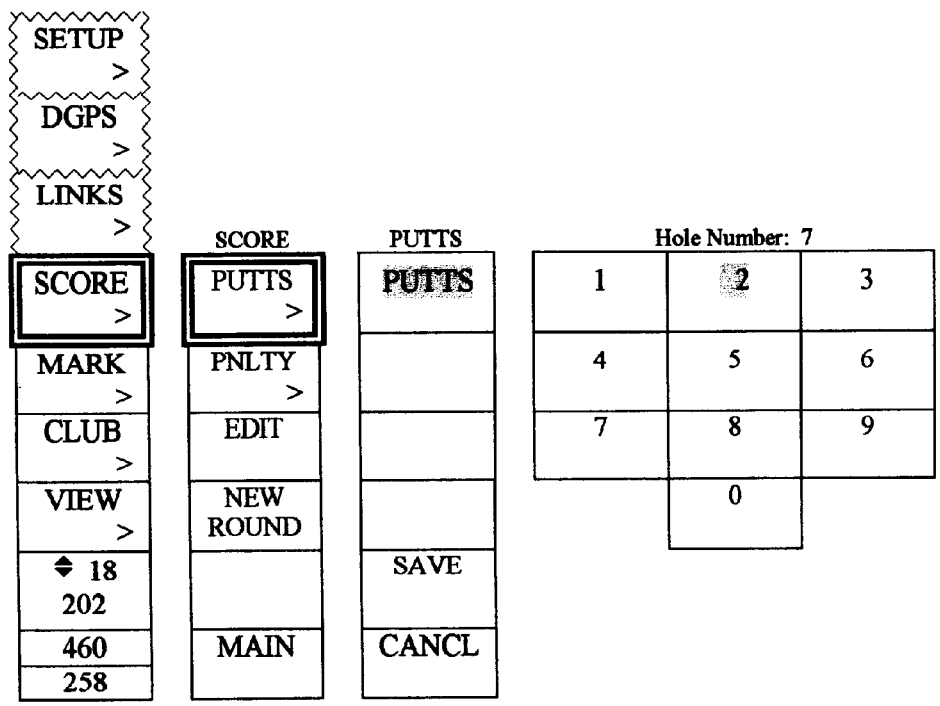
FIG. 21 shows a progression of left menu columns and a number pad table shown following an initial pressing of SCORE and a subsequent pressing of PUTTS during operation of the course player software.

Referring now to FIG. 21:

Score

When the "Score" button is pressed, the score menu is displayed and a standard 4 player score card (not depicted) shall be displayed in place of the course map. If restricted by display space only nine holes at a time may be displayed. The system will automatically keep score for the user of the system. This shall be accomplished by the marking of lies. The user shall be allowed to edit their system-derived score. The user will manually enter strokes on this screen for the other 3 players. This screen will have the following minimum information: hole number, par/hole, handicap/hole, strokes/hole, putts hole, strokes over or under/hole, total strokes/player, total putts/player, handicap/player, Net/player.

Putts

If "Putts" is pressed the button shall be highlighted and, in addition to the putts column a number pad is shown displayed in place of the score card for quantity of putts taken to be easily entered without a stylus. The default-highlighted number shall be 2. When a number is pressed on the number pad it shall be highlighted. When "Save" is pressed the putts are saved and the score card updated and redisplayed where the number pad was. Pressing "Save" after "Putts" also indicates the hole is complete and the next hole is displayed.

Penalty Strokes

Like "Putts" if "Pnlty" is pressed the button shall be highlighted and a number pad displayed for a quantity of penalty strokes to be easily entered without a stylus. The default-highlighted number shall be 1. When a number is pressed on the number pad it shall be highlighted. When save is pressed the penalty stokes are saved and the score card updated and redisplayed where the number pad was.

Edit

If "Edit" is pressed corrections to the score card may be made with the stylus. After "Edit" is pressed it shall be highlighted to indicate the current process. Player names may be entered or changed.

New Round

Pressing "NEW ROUND" shall cause the system to close and save the last played round of data and allow a new round with a clean score card. Players' names shall be retained.

Main

See common components following.

Figure 22:
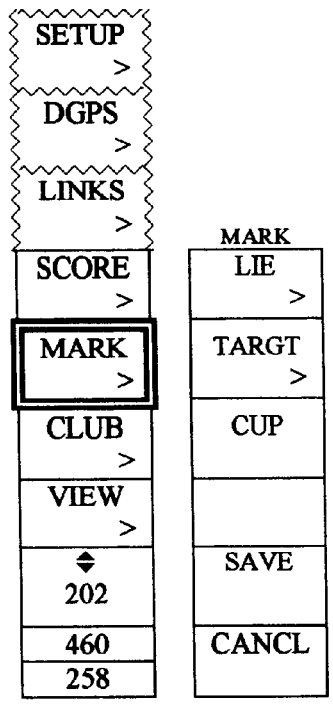
FIG. 22 shows a progression of left menu columns shown on the viewing display following an initial pressing of MARK during operation of the course player software.

Referring now to FIG. 22:

Mark

After pressing "Mark" on the Course Player screen, the menu of FIG. 22 is displayed in a dialog box.

Lie Location Marking

While standing over the ball, if the position module 17 is attached, or after marking the estimated current ball location, if the position module 17 is not attached, the user will press the "LIE" button to log the location of the ball before it is struck. A lie marker shall be dropped at the location. All lie markers shall be retained on the display until a new round is selected for play. The user can either "Save" the Lie mark or "Cancl" the mark. If the "Lie" button is pressed and the club used for the stroke that got the ball there has not been entered, the system will automatically open the "Club" dialog box and prompt for its entry.

Target Location Marking

The mark function shall provide the user with the ability to mark a target location i.e. the location the golfer is shooting toward before she swings. Before pressing the "Mark" button on the "Course Player" main screen the user will move the target cursor to the target location. The target cursor may be moved on the displayed map by touching a stylus or a finger tip to the display and dragging it to a new location or by using a mechanical joy stick that cause the target cursor to move in the indicated direction on the stick. When the "Target" button is pressed the system shall record the target location position to RAM for latter analysis. A target marker shall be dropped and remain on the display 28 until a new round is selected for play. The user can either "Save" the Target mark or "Cancl" the mark.

Cup

Pressing the "Cup" button indicates the last shot landed in the cup and the hole is complete. The user can either "Save" or "Cancl" the cup mark. The system shall then advance to the next complete hole view. If "Pin" is selected as the green reference point in setup, the system shall use the recorded pin location instead of the position presented by the position module 17. Otherwise, if "Center of Green" or "front of Green" is selected the real-time GPS position is logged.

Save

See common components following.

Cancl

See common components following

Figure 23:
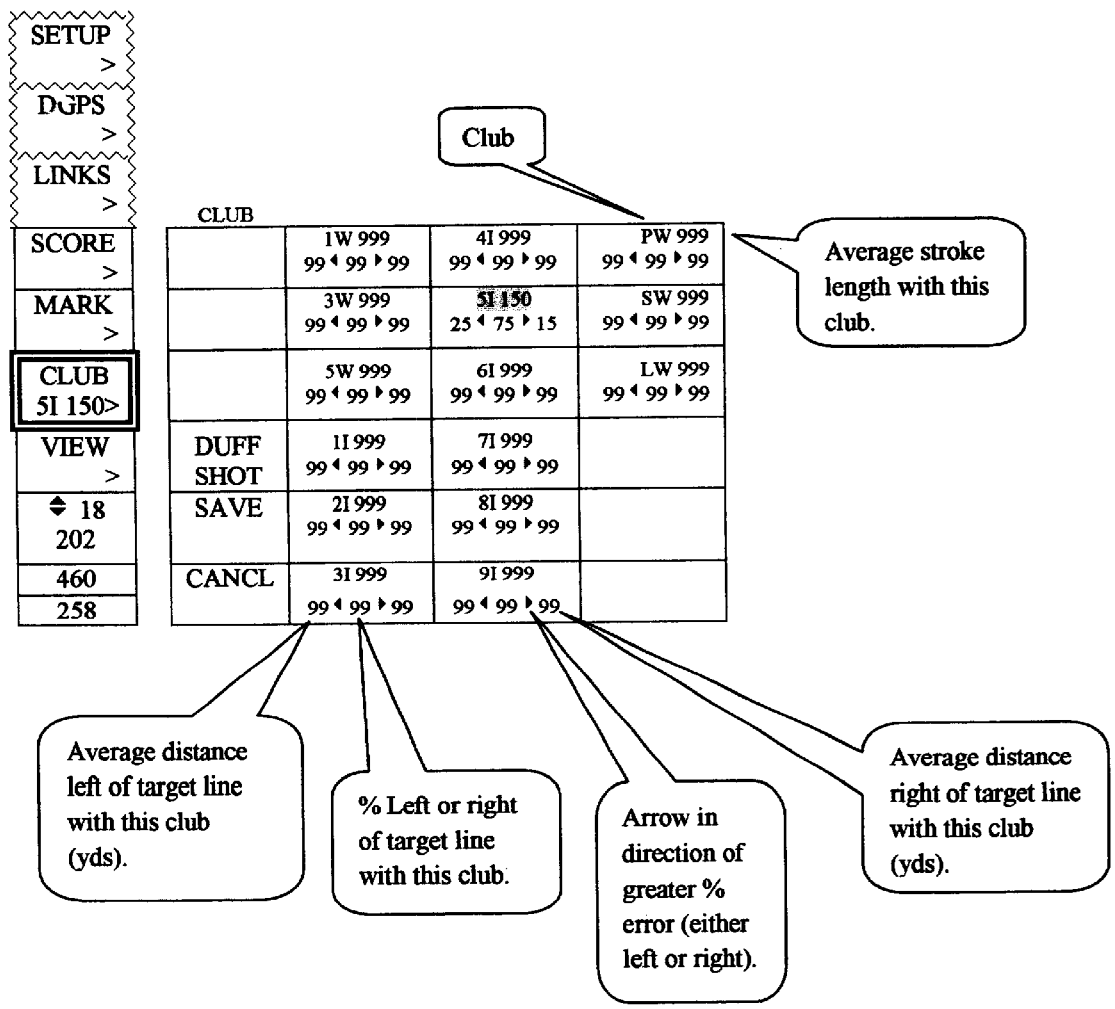
FIG. 23 shows a progression of a left menu column and a table shown on the viewing display with explanatory dialog boxes (dialog boxes not actually depicted on the viewing display) following an initial pressing of CLUB during operation of the course player software.

Referring now to FIG. 23:

Club

The "Club" button on the main Course Player menu is used to record clubs used during play and for viewing history of club performance. The best club for the shot to the target and that that clubs average distance is dynamically displayed on the club button as the target cursor is moved about the hole map in. The Club data table of FIG. 23 is displayed.

When this table is displayed, the distance value between the user and target cursor shall be used to highlight the club with the closest average distance. The club used for a particular stroke shall be selected after the swing and prior to marking the next lie. The selection of the actual club used shall be made on this display by pressing the screen for the club used. After pressing it, the button shall be highlighted. "Save" shall confirm the selection, log the information to RAM and update the score card.

Each button shows a club and average stroke length above, and shows below average distance left or right of the line, and % left or right for the higher of the two, from lie to intended marked target. For example, if a club yields 15% of the shots left of the line and 85% right "85▶" will be displayed below. The perpendicular distance value of the shots landing left of the target line are averaged and displayed left of the % value. The perpendicular distance value of the shots landing right of the target line are averaged and displayed to the right of the % value.

Duff Shot

This button is pressed when the player duffs a shot and does not want the location averaged into the club accuracy data. The location will be logged and the score card updated but the shot will not alter the club data.

Save

See common components following.

Cancl

See common components following.

Referring now to FIG. 24:

View

View will allow the user to better display a particular portion of the course being played.

Zoom

All palm software packages shall have the capability of displaying and zooming the current map while on the golf course. Operation will be the same as that defined above.

After each lie is marked, the system shall automatically zoom a rectangle including the green, the target and the current location with an added 10 yard buffer around the image.

In

Pressing "In" shall zoom in on the displayed map. All features become twice as large each time the in button is pressed. The system shall zoom in to the point that at least one point of a vector is displayed. The center of the map remains the center after zoom in. During this zoom, the green-up-for-current-hole orientation shall be used.

Out

Pressing "Out" shall zoom out on the displayed map. All features become half as large each time the out button is pressed. The system shall zoom out to the point that the whole course is displayed. The center of the map remains the center after zoom in. During this zoom the green-up-for-current-hole orientation shall be used.

Auto

Pressing "Auto" will toggle the zoom level between the "entire hole view" and the "intermediate zoom view". Similarly, the select button on the display module 1A not toggle the two views like "Auto" does. The "entire hole view" zooms the display to a full view of the hole in play as indicated on the scorecard. This view's extents will include the played tee box and hazards near the back of the green. During this zoom the green-up-for-current-hole orientation shall be used. The intermediate zoom view is a view that includes all the features enclosed by a rectangle that extends 10 yards beyond the current ball location and the green. The intermediate zoom view automatically displays following the marking of each new lie and it does not function until the first lie is marked. When the intermediate zoom view is invoked the target cursor is automatically positioned halfway between the lie and the green reference point.

Course

When "Course" is pressed the map of the entire course shall be displayed. For this button press only, the map is displayed north up. North may be determined from the Lat/Lon vector data. For all other zoom levels the green is up (toward the top of the display) for the currently selected hole in play. For green up, up is defined as the direction traveled along the normal play line for the hole with normal play proceeding up the fairway. For doglegs, with a marked reference in the fairway, up is in the direction beginning from the reference point and moving toward the front of the green. At full course zoom and only at full course zoom a hole number shall be placed on top of each hole with pixels cleared out around each number for uncluttered viewing of the number.

Back

See common components following.

Pan

This function operates as explained above for the course mapping methods.

◀

This menu button shall move the displayed map to the left each time it is pressed.

▶

This menu button shall move the displayed map to the right each time it is pressed.

▲

This menu button shall move the displayed map up each time it is pressed.

▼

This menu button shall move the displayed map down each time it is pressed.

Back

See common components following.

Main

See common components following.

Me

Pressing "Me" shall shift the map to place the receiver current location in the center of the display without changing zoom level.

Main

See common components following.

Scroll Menu Button

Pressing the menu button containing the ♦ will scroll the menu to the top or bottom. The active touch sensitive area for the ♦ symbol shall include the distance indicator area immediately below it also. This will provide a large touch area for he user. The number to the right of the up/down scroll arrows is the current hole in play and the one being scored.

Distance Indicators

Three numbers shall be displayed below the menu to indicate pertinent distances. In accordance with the orientation of green up the top number shall be the distance between the target cursor and the green. The middle number shall be the total distance from the receiver to the target cursor to the front of the green or pin or the distance from the receiver to the front of the green or pin. The bottom number shall be the distance between the current ball location and the target cursor.

Following a marked shot a line of play with a box containing the stroke length is displayed that connects the previous lie to the current lie.

Elevation to Target Cursor

A window shall be displayed, as depicted in FIG. 17, over the map that indicates the change in elevation between the ground level of the antenna position when the antenna is at the current ball location, and the ground level at the target cursor location. If the elevation at the target cursor is lower than the user the Δelevation is displayed as a negative value, if higher than the user a positive value, for example, −15 or +8. The window shall be positionable on the display by touching it with the stylus and dragging it. The window shall be turned on and off in setup. A value for the distance between the receiver's antenna and the ground will be entered in Setup. The elevation for both the target cursor and the user is calculated by interpolation between nearby points where elevation as a function of location has been surveyed and logged to a database. If English US units are selected in Setup the Δelevation is displayed in feet. If metric units are selected in Setup the Δelevation is displayed in meters and tenths.

Symbols

FIG. 25 defines symbols that are used only in Course Player. See common components following for symbols common to Course Player and Course Mapper. None of the symbols in this Figure change size during zoom.

Target Cursor

Touching the display in the area near the target cursor shall allow the user to drag it while still being able to see it. The area near the target cursor is defined as an imaginary square equal in size to or slightly larger than the extents of the cross hairs of the target cursor. After dragging it to a location on the screen a quick double tap on the touch screen outside the target cursor shall open a database and display the attribute type and associated note for the attribute in the target of the target cursor. The user shall not be able to drag the target cursor off the display. While the target cursor is being dragged the three distances displayed in the lower left corner of the main display are dynamically updated. When the display graphics will support it, two ghost lines shall follow the target cursor. One runs from the target cursor to the user location and one runs from the target cursor to the front of the green or pin. The ghost line may be turned on/off in "Setup".

Default Location

Upon moving on to the next hole of play, the target cursor is displayed at a default location on the hole. For par three holes the default location is the selected green reference point. The default location for all other holes is placed along the line connecting the front of the chosen tee box of play, an intermediate mapped point for dogleg holes and the front of the green or pin. The default target cursor placement is along the length of the described line above at a distance from the front of the selected tee box as defined by the user in the "Setup".

Lie Marker

The lie marker indicates a teed or played ball location. A lie marker is placed immediately prior to each stroke so that distance statistical data may be stored. After the user presses the "LIE" button to record the current ball position, the respective displayed distances shall begin to be calculated from the new lie. The lie marker shall be red or another shape for a penalty ball.

Target Marker

A target marker will be placed when the user moves the target cursor to a desired target spot on the course, presses the "Mark" button and then the "Target" button. Targets are removed from the display when a new round is started. Target data is logged in the database for statistical analysis.

Pin

If a daily pin placement file is present for the selected course the base of the flag pole symbol will be set at the pin location in the file for each hole.

Data Transfer

When the sync function of the display module 1A is activated, the player software shall facilitate uploading of all data to another computer, for example, a PC for use in a reply program.

Common Components of Course Player and Course Mapper

Bright light outdoor use and the very small display 28 of most palm-held computers suitable for use as the display module 1A, require high contrast colors and large font size whenever practical. For these reasons, text shown on the display 28 shall be black and placed on a white background whenever possible. The map background may be white. Font size for any item used during a round should be as large as possible.

When any main menu item touch sensitive button is pressed and the same menu list is displayed it may visibly change to indicate it is now the current dialog displayed.

The following buttons shall carry their respective definition wherever they are used throughout the system:

APPLY: Assumes the view of the data could have changed. It updates the current dialogs displayed values based on the current selections. It does not return to a previous dialog and does not advance dialogs.

SAVE: Assumes the view of the data could have changed. Save all changes since entering the current dialog and returns to the previous dialog.

CANCL: (Cancel) Assumes the view of the data could have changed. Save no changes since entering the current dialog and returns to the previous dialog.

MAIN: Assumes the view of the data could not have been changed. Returns to the main menu.

BACK: Assumes the view of the data could not have changed. Returns to the previous menu.

Referring now to FIG. 26:

dGPS

This dialog box shall allow interpretation and display of NMEA data flowing in the position module 17. The menu will help the user determine if switch settings on the position module 17 are correct for golf play, GPS or beacon diagnostics or configuration. An optional switch 59 on the position module 17 labeled "USE" and "SETUP" will allow the display module 1A to communicate with either the GPS receiver 52 or the differential beacon receiver 53.

Diff

Differential correction data is received by the beacon receiver 53 in the position module 17 from land based correction stations on the AM band. The correction data is then ported to the GPS receiver 52 for position correction or to the display module 1A for beacon receiver setup and performance monitoring. The optional switch 59 on the position module 17 may be used to make the selection.

Auto

Auto will be used to set the differential beacon receiver 53 to auto-tune mode. If "Auto" is pressed a beacon receiver command such as the following may be transmitted to the differential receiver 53: $GPMSK,,A,,A,n<CR><LF>. The display module 1A will listen for the Acknowledge return string ($PCSI,ACK,GPMSK,fff.f,A,ddd.A,n) from the beacon receiver 53. If it is not received, the user is instructed to check the battery power and switch setting. When it is received, the display module 1A displays a "Wait, scanning for beacon signal" window on the display 28.

Referring now to FIG. 26:

Pick

When "Pick" is selected a menu allowing the user to initiate a signal strength query is displayed.

Scan

Selecting "SCAN" shall send a Global Search command such as $PCSI,4<CR><LF>, pause 5 seconds and then send a Receiver Search Dump command such as $PCSI, 3<CR><LF> to the differential receiver. The receiver search dump may return data in the $PCSI,xx,ffff,sid,ci,snr,ss format for all 84 possible frequencies in the beacon radio spectrum. The display module 1A shall select the 5 strongest signals and display them in order of quality to the user for manual selection as shown below. When a city is selected by being pressed it changes shades to indicate its selection.

A beacon database shall be provided with the Mapper and Player software so that station ID numbers can be cross-referenced to city locations and names and distances may be computed.

Distance to each transmitter shall be computed to a known point on the selected golf course or the current location if available.

Ver#

Selecting "Ver#" shall poll and display hardware and firmware serial numbers for the GPS receiver 52 and the differential receiver 53.

Referring now to FIG. 28:

GPS

Strings of GPS positional data shall be received by the Display Module 1A software. The strings shall be in NMEA 0183 Version 2.01format and consist of GGA, GSA and RMC messages. Position shall be calculated using the full resolution of the NMEA Lat/Lon data. When "GPS" is selected the serial port is polled to determine if no data is present, RTCM data is present or NMEA strings are present. If RTCM is present a window will be displayed instructing the user to set the "USE"/"SETUP" switch to "USE". If no data is present, the user is instructed that no data is being received from the dGPS module and to ensure the battery power is ok, the switch is set to "USE" and the port is connected.

Referring now to FIG. 30:

Symbols

The symbol table shown at FIG. 29 contains examples of symbols which may be used to refer to the various elements listed. A representative indication is depicted. Each symbol is given a hierarchical number to indicate which is drawn on top of the other when displayed. For example, a bunker may lie completely within the perimeter of a fairway. If the bunker had a lower priority than the fairway it would be completely overwritten when the fairway is drawn on the display.

Hole

A hole is an actual or fictitious border around the fairway, tee boxes, green and nearby bunkers.

Tee Box

A tee-box is depicted as an enclosed area with no fill pattern. It will carry a label of Gold (yardage), Blue (yardage), White (yardage), Green (yardage) and Red (yardage).

Green

A green is depicted as an enclosed area with no fill pattern.

Fairway

A fairway is depicted as an enclosed area with no fill pattern.

Rough

This symbol shall be used in a repeated pattern to indicate a rough when the area is zoomed enough to allow the display of it. A large rough area may be mapped without walking all the way around it to indicate an area by using the line feature. The mapper will walk a line along the edge of the rough area. It will be indicated by a linear equivalent of the same pattern and color as rough area and be 4' wide.

Ditch

A ditch is depicted as a line. A line on both sides of it may depict a wide ditch.

Building

A large group of buildings may be mapped without walking all the way around them to indicate an area by using the line feature. The mapper will walk a line along the edge of the area. It will be indicated by a linear equivalent of the same pattern and color as a building area and be 4' wide.

Bunker

This symbol shall be used in a repeated pattern to indicate a sand hazard when the area is zoomed enough to allow the display of it.

Water

This symbol shall be used in a repeated pattern to indicate a water hazard when the area is zoomed enough to allow the display of it. A large body of water may be mapped without walking all the way around it to indicate an area by using the line feature. The mapper will walk a line along the edge of the area. It will be indicated by a linear equivalent of the same pattern and color as water area and be 4' wide.

Bush

This symbol shall be used to indicate a bush or bushes when the area is zoomed enough to allow the display of it. As an area is zoomed more bushes will be indicated and they will have a geographically correct location. The geographical location will be the bottom of the bush symbol. A large group of bushes may be mapped without walking all the way around them to indicate an area by using the line feature. The mapper will walk a line along the edge of the area. It will be indicated by a linear equivalent of the same pattern and color as bush area and be 4' wide.

Tree

This symbol shall be used to indicate a tree or trees when the area is zoomed enough to allow the display of it. As an area is zoomed more trees will be indicated and they will have a geographically correct location. The geographical location will be the bottom of the tree symbol. A large group of trees may be mapped without walking all the way around them to indicate an area by using the line feature. The mapper will walk a line along the edge of the area. It will be indicated by a linear equivalent of the same pattern and color as an area of trees and be 4' wide.

Rock

A large rocky area may be mapped without walking all the way around it to indicate an area by using the line feature.

The mapper will walk a line along the edge of the area. It will be indicated by a linear equivalent of the same pattern and color as a rock area and be 4' wide.

Cart Path

A cart path is depicted as a 6' wide solid gray line on a color display.

Out of Bounds

A broken line shall indicate out of bound marks.

Area too Small to Display

As the user zooms out the whole area featured indicated by this symbol will be displayed.

Current Location

This symbol indicates the location of the system. It blinks and moves at the 1 Hz dGPS update rate. Concentric circles around this rover cursor shall be turned on and off in setup. The concentric circles shall appear at 5 yard/meter intervals out to 20 yards/meters. This feature will permit the user to estimate his ball location from the cart and mark it on the display to facilitate club selection without leaving the cart.

The software and data file formats shall be characterized as follows:

File Formats

The files on the display module may be stored and accessed from device RAM or a Compact Flash card or other memory system.

Course Map File

The course map data file shall be binary with one file per course and may contain all information for that course. They shall have a file name compatible with the operating system of the display module 1A. The map data file shall include all necessary data to fulfill the functionality described in this document yet minimized to conserve RAM requirements. The map data file format shall include bytes for elevation data to be added later.

Daily Pin Placement File

The pin placement data file shall be binary with one file per course and may contain all pin placement info for that course. They shall have a file name "coursename.dpp" or otherwise as is compatible with the operating system of the Display Module 1A. The pin placement data file shall include all necessary data to fulfill the functionality described in this document yet minimized to conserve RAM requirements. At a minimum, the database will contain the following fields: date, hole number, latitude, longitude.

Player Data File

The player data file may be ASCI format with the capability of storing multiple player's data per file and shall contain all personal information for each player. They shall have a file extension "*.clb" or otherwise as is compatible with the operating system of the display module 1A. The player data file shall include all necessary data to fulfill the functionality described in this document yet minimized to conserve RAM requirements.

Round Data File

The round data file shall be ASCI format and shall store locational and scoring data for one round of golf per file. A round can be any combination of nine holes. It shall have a file extension "99-99-99 9.scr" or otherwise as is compatible with the operating system of the display module 1A. This name will indicate the date the round was played and the round number one through nine for that date. The round data file shall include all necessary round data to fulfill the functionality described in this document yet minimized to conserve RAM requirements. At a minimum the database will contain the following data: date, course name, hole number, stoke number, latitude and longitude.

dGPS Status

If the differential signal is lost an alert status window will automatically appear with details on the lost signal's city name. If less than 4 GPS satellites are being tracked an alert status window will appear prompting the user to attempt to remedy the signal blockage by turning or moving.

Internet Implementation

In addition to the Map Exchange previously disclosed, the system may include the following elements implemented through a public access computer network such as the Internet:

Software Upgrades

A website may have a page for access to new Course Mapper, Course Player and other software upgrades. This page will also provide instruction for upgrade installation.

Mapping Hints

This page will evolve as use of the Course Mapper product grows. It shall provide tips for general mapping and help for users with specific mapping anomalies.

Beacon Auto E-mail

E-mail notification shall be made available for marine beacon outages, planned or unplanned. We will automatically query the coast guard's web site for publications and automatically send out email based on a users selected region or towers or courses.

User Forum

A user forum shall be included for direct interaction between players.

Course Transfer

The course transfer portion of the site is perhaps one of its most important aspects. The course data transferred here will be in a proprietary format.

Upload

As previously described, a user shall be able to access the Web site and indicate a desire to upload a mapped course to be presented for use by others. The only map files that will be accepted by the server will be those that are defined in the Course Map File section of this document. Once uploaded and reviewed, if the course meets the administrators acceptable minimum quality standards it is added to those that may be viewed on the download page. If a course owner wishes to upload a daily pin placement file they must enter a password.

Download

As previously described, on the Download pages courses shall be grouped by Country, State/Province, City, Course and mapper name (person who is submitting it to the site). It shall be possible to have multiple maps of the same course with different mapper names. Some users may prefer a particular mapper's techniques to another. The potential downloader shall be permitted to view a course before it is downloaded. A forum for golf course map requests will be offered in hopes of stimulating someone to add a missing course. Users will have the choice of downloading the entire course or just pin placements. All downloadable files will carry a creation or edit date.

Virtual ClubHouse

The Virtual ClubHouse will allow users to upload data for a round or multiple rounds and perform various statistical operations on the sequential locational data. Based on this analysis the player may be tutored.

Upload

The upload function shall allow transfer of game shot data from the Palm PC to the Web Site directly or via a desk top PC.

Game Replay

Web ready GIS software will be used so patrons will be able to display and navigate across a course in raster and or vector depending on what is available. A Java applet may be ran to depict replay of a round with speed of replay being adjustable. Replay will be depicted as a ball beginning from the tee box and sequentially arching its way to each marked location.

Background Map

A georeferenced and rectified satellite image or aerial photograph of the course may be selected as the background image for a graphical display of the various ball lies. This backdrop may also be used for strategic play planning. The logged elevations from the Elevation Mapper software may be overlaid onto the image as vector topography lines.

In view of the above, it will be seen that the various objects and features of the invention are achieved and other advantageous results obtained. The examples contained herein are merely illustrative and are not intended in a limiting sense.

What is claimed is:

1. A method of storing and communicating sets of topographic information to and from information processing and viewing devices by means of an accessible electronic network, each of the sets being specific to an individual golf course, comprising the steps of:
   (a) inputting a first set of information to a first information processing and viewing device, said first set of information being data representative of a golf course topography, said first set of information including data elements relating to attributes of the golf course, said data elements including at least one location for each of said attributes in the set and said first information processing and viewing device executing course-mapper software;
   (b) transmitting said first set of information from the first information processing and viewing device to the network; and
   (c) accessing said first set of information through said network with a second information processing and viewing device with autonomy from any positional equipment at the golf course, said second information processing and viewing device executing course-player software.

2. The method of claim 1 wherein said inputting step further comprises the steps of:
   receiving location data via an antenna connected to a position module;
   connecting said position module to said first information processing and viewing device, said first information processing and viewing device being operable to execute said course-mapper software when said antenna is in a reception only mode.

3. The method of claim 1 wherein said inputting step further comprises the steps of:
   selecting a label corresponding to one of said attributes from a set of labels corresponding to said attributes of the golf course;
   receiving location data from a position module;
   determining a relative accuracy of said location data;
   assigning said relative accuracy to said location data;
   labeling said location data with said selected label to form one of said data elements;
   indicating said relative accuracy by displaying said location data with a visual signifier;
   repeating said selecting and assigning steps for a plurality of attributes of the golf course to produce said first set of information; and
   saving said first set of information as a map file for said golf course topography.

4. The method of claim 1 including the additional steps of:
   (d) altering the set of information accessed from the network with said second device and with autonomy from any positional equipment at the golf course to produce a second set of information representative of the golf course topography;
   (e) transmitting said second set of information to the network; and
   (f) providing access to said altered set of information with autonomy from any positional equipment at the golf course.

5. The method of claim 4 wherein the altering of the first set of information increases the accuracy of the data correspondence to the golf course attributes to produce a second set of information which is more correctly representative of the golf course than the first set.

6. The method of claim 1 including the additional steps of:
   (d) inputting a second set of information to said second information processing and viewing device, said second set of information relating to at least one ball location as a result of playing the golf course by at least one individual;
   (e) displaying said first and second sets of information on said second information processing and viewing device, wherein said ball location is displayed as a moving representation with respect to said golf course topography; and
   (f) replaying said displaying step for said first and second sets of information in at least one alterable manner including an adjustable replay speed for said moving representation.

7. The method of claim 1 further comprising the step of entering a user application into said second information processing and viewing device, wherein said user application includes player software suited for an application selected from the group consisting of navigation, hiking, hunting, biking, farming, and golfing, wherein said player software displays a moving representation for said application in at least one alterable manner, including an adjustable replay speed for said application's moving representation.

8. The method of claim 1 including the additional steps of:
   (d) storing said first set of information in a publicly accessible database, said database further storing additional sets of information representative of a plurality of golf courses; and
   (e) providing access over said network to the stored sets of information in the database with autonomy from any positional equipment at said plurality of golf courses.

9. The method of claim 8 wherein the stored sets of information accessed from the database are alterable with autonomy from any positional equipment at said plurality of golf courses.

10. The method of claim 8 wherein said database is accessible by connection to a web site, said web site providing the information sets in a form accessible with a web browser.

11. The method of claim 1 wherein said golf course topography includes processing and displaying difference-of-elevation information between any two points on the golf course as selected on the processing and viewing device.

12. The method of claim 11 wherein said difference-of-elevation is interpolated from Global Positioning System data and a georeferenced elevation dataset.

13. A system of storing and communicating sets of topographic information to and from information processing and viewing devices by means of an accessible network, each of the sets being specific to an individual golf course, comprising:

(a) a first information processing and viewing device executing course-mapper software and receiving input of a first set of information, said first set of information being data representative of a golf course topography, said first set of information including data elements relating to attributes of the golf course, said data elements including at least one location for each attribute in the set;

(b) a central information processing site and database receiving said set of information from said first information processing and viewing device and providing access to said set over the network; and (c) a second information processing and viewing device receiving transmission of said first set of information from the first information processing device over the network and with autonomy from any positional equipment at the golf course.

14. The system of claim 13 wherein said first information processing and viewing device is operable for executing said course-mapper software with an antenna in a reception only mode and with autonomy from any positional equipment at the golf course.

15. The system of claim 13 wherein at least one of said first and second information processing and viewing devices comprises:

a position module with an antenna receiving location data; and a display module being in operable communication with said position module for receiving said location data therefrom, said display module comprising a portable hand-held personal computer and a viewer, wherein said portable computer executes said course-mapper software, determines a relative accuracy of said location data, assigns said relative accuracy to said location data, and causes said viewer to display said location data with said visual signifier to indicate said relative accuracy.

16. The system of claim 13 including:

(d) altering with said second device and with autonomy from any positional equipment at the golf course the set of information accessed from the network to produce a second set of information representative of the golf course topography; and (e) transmitting said second set of information over the publicly accessible network to the central information processing site and database, said central site then selectively providing access to said altered set of information over the network with autonomy from any positional equipment at the golf course.

17. The system of claim 16 wherein the altering of the first set of information increases the accuracy of the data correspondence to the golf course attributes to produce a second set of information which is more correctly representative of the golf course than the first set.

18. The system of claim 13 wherein a second set of information is received and processed by said second information processing and viewing device, said second set of information relating to at least one ball location as a result of playing the golf course by at least one individual, and wherein said second information processing and viewing device displays said ball location as a moving representation with respect to a display of said golf course topography, and wherein said second information processing and viewing device replays said ball location in at least one alterable manner including an adjustable replay speed for said moving representation.

19. The system of claim 13 wherein a user application is entered into said second information processing and viewing device, said user application including player software suited for an application selected from the group consisting of navigation, hiking, hunting, biking, farming, and golfing, wherein said player software displays a moving representation for said application in at least one alterable manner, including an adjustable replay speed for said application's moving representation.

20. The system of claim 13 wherein said central site and database further contain additional sets of information representative of a plurality of golf courses; and provides access over said network to the additional sets of golf courses information in the database with autonomy from any positional equipment at said plurality of golf courses.

21. The system of claim 20 wherein the stored sets of information accessed from the database are alterable with autonomy from any positional equipment at said plurality of golf courses.

22. The system of claim 20 wherein said database is accessible by connection to a web site, said web site providing the information sets in a form accessible with a web browser.

23. The system of claim 13 wherein said golf course topography includes processing and displaying difference-of-elevation information between any two points on the golf course as selected on the processing and viewing device.

24. The system of claim 23 wherein said difference-of-elevation is interpolated from Global Positioning System data and a georeferenced elevation dataset.

25. A portable information processing and viewing device for storing and communicating topographic information comprising:

a portable information processing and viewing device, said device having an information processor for the storage, retrieval and processing of a map data file including position information, said device also having a viewer for the display of said position information, said device further having data inputs, said data inputs including at least one of a user interface and direct electrical connections;

said position information including location data and a corresponding data label relating to at least one topographic characteristic of at least one selected geographic region, said map data file also including relative accuracy data corresponding with said location data, said characteristic being represented on said viewer by visual signifiers, said visual signifiers including at least a representation of an attribute and an indication of a position of said topographic characteristic, wherein said indication of said position by said visual signifiers further includes an indication by said visual signifiers of said relative accuracy data corresponding with said location data; and said direct electrical connections adapted for connection with at least one cooperative device for enabling said information processing and viewing device to perform an operation of at least one of generating, accessing, storing and communicating of said map data file, wherein said cooperative device further enables said information processing and viewing device to autonomously process and display said position information.

26. The information processing and viewing device according to claim 25 wherein said cooperative device is a position module having an antenna for enabling said information processing and viewing device to modify said location data, and wherein said information processing and viewing device is operable to at least store, retrieve and process said modified location data with an antenna in a reception only mode.

27. The information processing and viewing device according to claim 25 wherein said location data is generated with a position module by attaching said position module as said cooperative device, said data label corresponding to said location data is generated with said user interface by selecting a label from a set of labels corresponding to a set of attributes for said geographic region, and said relative accuracy data is assigned to said location data by said processor, and wherein said location data is comprised of latitude and longitude for said position of said topographic characteristic, said data label is comprised of said selected label for said topographic characteristic, and said relative accuracy data is comprised of a quality value determined for said location data.

28. The information processing and viewing device according to claim 27, wherein said geographic region includes a golf course and said position information relates to a plurality of attributes of said golf course, and wherein said information processing and viewing device retrieves said map data file autonomously from any positional equipment at said golf course.

29. The information processing and viewing device according to claim 25 wherein said cooperative device is a position module for enabling said information processing and viewing device to modify said location data, wherein said position module receives said location data, said processor assigns said relative accuracy data to said location data, said viewer indicates with said visual signifiers a quality value of said location data; and said location data is altered with said user interface.

30. The information processing and viewing device according to claim 29, wherein said geographic region includes a golf course and said position information relates to a plurality of attributes of said golf course, and wherein said information processing and viewing device retrieves said map data file autonomously from any positional equipment at said golf course.

31. The information processing and viewing device according to claim 25 wherein said cooperative device is a detachable position module which enables the information processing and viewing device to store said map data file relating to topographic characteristics of said selected geographic region; and wherein said detachable position module and said map data file are transferable to a second information processing and viewing device for enabling said second information processing and viewing device to access said map data file, and wherein said second information processing and viewing device receives, processes and displays additional location data relating to said geographic region, said additional location data for said geographic region being displayed as a moving representation with respect to a display of said map data file for said geographic region, wherein said second information processing and viewing device replays said moving representation in at least one alterable manner, including an adjustable replay speed for said moving representation.

32. The information processing and viewing device according to claim 25 wherein said cooperative device is a data link.

33. The information processing and viewing device according to claim 32 wherein said data link is a connection to a personal computer for the communication of data between said information processing and viewing device and said computer.

34. The information processing and viewing device according to claim 32 wherein said data link is a connection to a network for the communication of data between said information processing and viewing device and said network.

35. The information processing and viewing device according to claim 34 wherein said network is a private access network.

36. The information processing and viewing device according to claim 34 wherein said network is a publicly accessible network such as the Internet.

37. The information processing and viewing device according to claim 34 wherein said network provides said information processing and viewing device access to an additional map data file.

38. The information processing and viewing device according to claim 34 wherein said network provides said information processing and viewing device storage of said map data file.

39. The information processing and viewing device according to claim 34 wherein said network provides said information processing and viewing device access to an archived map data file, said archived map data file being modifiable by said information processing and viewing device following access; and said network further providing said information processing and viewing device storage of said modified archived map data file.

40. The information processing and viewing device according to claim 25 wherein said position information relates to a plurality of attributes of a golf course and is modifiable by said information processing and viewing device, wherein said information processing and viewing device retrieves said map data file autonomously from any positional equipment at said golf course and generates a round data file autonomously from any positional equipment at said golf course, said round data file including ball location data.

41. The information processing and viewing device according to claim 40 wherein said position information is modified with said user interface to increase said relative accuracy data of said modified position information.

42. The information processing and viewing device according to claim 40 wherein said modified position information and said round data file are storable in the information processing and viewing device.

43. The information processing and viewing device according to claim 40 wherein said modified position information and round data file are communicable with a data link cooperative device over a network.

44. A portable information processing and viewing device for storing and communicating topographic information comprising:

a portable information processing and viewing device, said device having an information processor for the storage, retrieval and processing of data which encodes information, said device also having a viewer for the display of information encoded in the data, said device further having data inputs, said data inputs including at least one of a user interface and direct electrical connections;

said information, encoded in the data, includes information relating to at least one topographic characteristic of at least one selected geographic region, said topographic characteristic being represented on said viewer by visual signifiers, said visual signifiers including at least a representation of an attribute and an indication of a position of said topographic characteristic;

said direct electrical connections adapted for connection with at least one cooperative device for enabling said information processing and viewing device to perform an operation of at least one of generating, accessing, storing and communicating of said data, wherein said cooperative device further enables said information processing and viewing device to autonomously process and display said information relating to topographic characteristics;

wherein said geographic region includes a golf course, said golf course represented on said viewer by at least a partial display of a selected hole of said golf course; and wherein additional information relating to playing said golf course is displayed as a moving representation with respect to said partial display of said golf course, said moving representation being displayable in alterable manners, said alterable manners including the rate of progression of said representation.

45. The information processing and viewing device according to claim 44 wherein a location on said golf course is communicated via said direct electrical connections by attaching a position module as said cooperative device, and wherein said information processing and viewing device displays the topographic characteristics of said location.

46. The information processing and viewing device according to claim 45 wherein the display of the topographic characteristics of said location includes an indication of a position of said location and a corresponding representation of an attribute at said location, wherein said information relating to said topographic characteristic is comprised of location data and a data label corresponding with said location data, and wherein said location data is comprised of latitude and longitude for said position of said topographic characteristic and said data label is comprised of a label for said attribute of said topographic characteristic, said label being selected from a set of labels corresponding with a set of attributes for said geographic region.

47. The information processing and viewing device according to claim 46, wherein said information relating to said topographic characteristic is further comprised of relative accuracy data corresponding with said location data, said relative accuracy data being comprised of a quality value determined for said location data, wherein the display of the topographic characteristics of said location includes an indication of said quality value of said location data.

48. The information processing and viewing device according to claim 47 wherein the display of said information of playing said golf course further includes information relating to the playing of a golf shot from said location.

49. The information processing and viewing device according to claim 46 wherein said information relating to said topographic characteristic includes elevation information, and wherein a difference-of-elevation is processed and displayed on said viewer in response to a selection of two locations.

50. The information processing and viewing device according to claim 44 wherein said cooperative device is a position module with an antenna for receiving a location on said golf course, and wherein said information processing and viewing device is operable to at least store, retrieve and process said information relating to said topographic characteristic with said antenna in a reception only mode.

51. The information processing and viewing device according to claim 44 wherein said cooperative device is a data link to a second information processing device, said second information processing and viewing device including player software suited for an application selected from the group consisting of navigation, hiking, hunting, biking, farming, and golfing, wherein said player software displays a moving representation for said application in at least one alterable manner including the rate of progression of said application's moving representation.

52. The information processing and viewing device according to claim 44 wherein said cooperative device is a data link to a network.

53. The information processing and viewing device according to claim 44 wherein said information processing and viewing device includes player software suited for an application selected from the group consisting of navigation, hiking, hunting, biking, farming, and golfing, wherein said player software displays a moving representation for said application in at least one alterable manner including the rate of progression of said application's moving representation.

54. A portable information processing and viewing device for storing and communicating topographic information comprising:

a portable information processing and viewing device, said device having an information processor for the storage, retrieval and processing of a data set, said device also having a viewer for the display of said data set, said device further having a user interface and direct electrical connections;

said data set comprising at least one corresponding set of location information, a data label and relative accuracy data, said location information and said data label relating to at least one topographic characteristic of at least one selected geographic region and said relative accuracy data relating to a quality value for said corresponding location information, said geographic regions including at least one golf course, said characteristic being represented on said viewer by visual signifiers, said visual signifiers including at least a representation of an attribute and an indication of a position of said topographic characteristic, wherein said indication of said position by said visual signifiers includes an indication of said relative accuracy of said location information, and wherein said location information is comprised of latitude and longitude for said position of said topographic characteristic and said data label is comprised of a label for said attribute of said topographic characteristic, said label being selected from a set of labels corresponding with a set of attributes for said geographic region;

said direct electrical connections adapted for connection with at least one cooperative device for enabling said information processing and viewing device to perform an operation of at least one of generating, accessing, storing and communicating of said data set, said cooperative device further enabling said information processing and viewing device to autonomously process and display said information relating to topographic characteristics;

wherein said cooperative device is a detachable position module generating said location information, said user interface receives said selected label, and said processor assigns said relative accuracy data to said location data, and said information processor calculates said quality value and assigns said relative accuracy data to said corresponding location information, wherein said detachable position module has an antenna for receiving position related information and wherein said information processing and viewing device is operable to at least store, retrieve and process said data set with said antenna in a reception only mode; and wherein said detachable position module and said data set are transferable to a second information processing and viewing device, and wherein said second information processing and viewing device receives, processes and displays additional location information relating to playing said golf course, said additional location information for playing said golf course being displayed as a moving representation with respect to a display of said data set for said golf course, wherein said second information processing and viewing device replays said moving representation in at least one alterable manner, including an adjustable replay speed for said moving representation.

55. A portable information processing and viewing device for storing and communicating topographic information comprising:

a portable information processing and viewing device, said device having an information processor for the storage, retrieval and processing of data which encodes information, said device also having a viewer for the display of information encoded in the data, said device further having data inputs, said data inputs including at least one of a user interface and direct electrical connections;

said information, encoded in the data, relating to at least one topographic characteristic of at least one selected geographic region, said geographic regions including at least one golf course, said characteristic being represented on said viewer by visual signifiers, said visual signifiers including at least a representation of an attribute and an indication of a position of said topographic characteristic;

said direct electrical connections adapted for connection with at least one cooperative device for enabling said information processing and viewing device to perform an operation of at least one of accessing, storing and communicating of said data, said cooperative device further enabling said information processing and viewing device to autonomously process and display said information relating to topographic characteristics;

wherein at least one of said cooperative devices is a position module having an antenna for receiving position related information and wherein said information processing and viewing device is fully operable with said antenna in a reception only mode.

56. The information processing and viewing device according to claim 55 wherein said position module receives Global Positioning Satellite information.

57. The information processing and viewing device according to claim 55 wherein said information relating to said topographic characteristic is comprised of location data and a data label corresponding with said location data, said location data and said data label being stored in a map data file, and wherein said location data is comprised of latitude and longitude for said position of said topographic characteristic and said data label is comprised of a label for said attribute of said topographic characteristic, said label being selected from a set of labels corresponding with a set of attributes for said geographic region.

58. The information processing and viewing device according to claim 57 wherein said information relating to said topographic characteristic is further comprised of relative accuracy data corresponding with said location data, said relative accuracy data being comprised of a quality value determined for said location data, wherein the display of the topographic characteristics of said location includes an indication of said quality value of said location data.

59. The information processing and viewing device according to claim 57 wherein a second cooperative device is a data link for providing communication of said map file to a second information processing device autonomously from any positional equipment at said golf course.

60. The information processing and viewing device according to claim 57 wherein a second cooperative device is a data link for providing communication of said map file over a network autonomously from any positional equipment at said golf course.

61. The information processing and viewing device according to claim 57 wherein said position module also communicates ball location data over said direct electrical connections, said information processor generates a round data file with said ball location data, and said viewer displays said round data file for said ball location as a moving representation with respect to said map data file for said golf course, and wherein said information processing and viewing device replays said moving representation in at least one alterable manner including an adjustable replay speed for said moving representation.

62. The information processing and viewing device according to claim 61 wherein said information processing and viewing device includes player software suited for an application selected from the group consisting of navigation, hiking, hunting, biking, farming, and golfing, wherein said player software displays a moving representation for said application in at least one alterable manner, including an adjustable replay speed for said application's moving representation.

63. The information processing and viewing device according to claim 57 wherein said location data further comprises elevation for said position of said topographic characteristic, and wherein a difference-of-elevation is processed and displayed on said viewer in response to a selection of two locations.

64. The information processing and viewing device according to claim 57 wherein said location data further comprises elevation for said position of said topographic characteristic, and wherein a difference-of-elevation is processed and displayed on said viewer in response to a selection of two locations.

65. The information processing and viewing device according to claim 55 wherein said one cooperative device is a position module that receives Global Positioning Satellite information relating to locations on said golf course and differential correction information for correcting said Global Positioning Satellite information;

wherein said information relating to locations includes information relating to a relative height of said location and a means to display the same to the user;

a second cooperative device is a means for accessing a stored set of information relating to locations on said golf course, wherein said second cooperating device utilizes said Global Positioning Satellite and said differential correction information to increase a degree of accuracy of said stored set of information; and wherein said increase in the degree of accuracy of said stored set of information includes an increase in the degree of accuracy of a relative height of said location.

66. The information processing and viewing device according to claim 65 wherein the relative height of said location displayed to the user changes dynamically with respect to a target location selected as the information processing and viewing device receive input from the user.

67. The information processing and viewing device according to claim 66 wherein the user input is transmitted by a stylus dragged across a displayed map.

68. The information processing and viewing device according to claim 55 wherein said antenna is detachable for flexible placement.

69. The information processing and viewing device according to claim 68 wherein said antenna is flexibly placeable for improved reception.

70. The information processing and viewing device according to claim 55 wherein said antenna is flexibly placeable for greater accuracy of position determination by closer placement of said antenna to a location for which position is to be determined.

71. A method of storing and displaying sets of topographic information, comprising the steps of:
  (a) inputting a first set of information to a portable information processing and viewing device, said first set of information being data representative of a topography, said first set of information including data elements relating to attributes of said topography, said data elements including at least one location for each of said attributes;
  (b) inputting a second set of information to said portable information processing and viewing device, said second set of information relating to location data for traversing said topography;
  (c) displaying said first and second sets of information on said portable information processing and viewing device, wherein said location data for traversing said topography is displayed as a moving representation with respect to said topography; and
  (d) replaying said displaying step for said first and second sets of information in at least one alterable manner including an adjustable replay speed for said moving representation.

72. The method of claim 71, further comprising the step of receiving said location data for traversing said topography via an antenna operable in a reception only mode.

73. The method of claim 71, further comprising the steps of assigning at least one location-quality identifier to said data elements in said first set of information and assigning a visual signifier according to said location-quality identifier, wherein said visual signifier identifies a relative accuracy of said data elements in said displaying step.

74. A method of storing and displaying sets of topographic information, each of the sets being specific to an individual golf course, comprising the steps of:
  (a) inputting a first set of information to a portable information processing and viewing device, said first set of information being data representative of a golf course topography, said first set of information including data elements relating to attributes of the golf course, said data elements including at least one location for each of said golf course attributes;
  (b) inputting a second set of information to said portable information processing and viewing device, said second set of information relating to at least one ball location as a result of playing the golf course by at least one individual;
  (c) displaying said first and second sets of information on said portable information processing and viewing device, wherein said ball location is displayed as a moving representation with respect to said golf course topography; and
  (d) replaying said displaying step for said first and second sets of information in at least one alterable manner including an adjustable replay speed for said moving representation.

75. The method of claim 74, further comprising the step of receiving said second set of information relating to at least one ball location via an antenna operable in a reception only mode.

76. The method of claim 74, further comprising the steps of assigning at least one location-quality identifier to said data elements in said first set of information and assigning a visual signifier according to said location-quality identifier, wherein said visual signifier identifies a relative accuracy of said data elements in said displaying step.

77. The method of claim 74 wherein said golf course topography includes processing and displaying difference-of-elevation information between any two points on the golf course as selected on said portable processing and viewing device.

78. The method of claim 77 wherein said difference-of-elevation is interpolated from Global Positioning System data and a georeferenced elevation dataset.

79. A system of storing and communicating sets of topographic information to and from information processing and viewing devices by means of an accessible network, comprising:
  (a) a first information processing and viewing device receiving input of a first set of information, said first set of information being data representative of a topography, said first set of information including data elements relating to attributes of said topography, said data elements including at least one location for each attribute in the set;
  (b) a second set of information relating to location data for traversing said topography;
  (c) a central information processing site and database receiving said first and second sets of information from said first information processing and viewing device and providing access to said sets over the network; and
  (d) a second information processing and viewing device receiving transmission of said first and second sets of information, displaying said location data for traversing said topography as a moving representation with respect to said topography, and replaying said moving representation in at least one alterable manner including an adjustable replay speed for said moving representation.

80. The system of claim 79 wherein said topography is a course and said location data for traversing said course relates to a round on said course.

81. The system of claim 79 wherein said topography is a golf course and said location data for traversing said golf course relates to the playing of a golf ball on said golf course.

82. A system of storing and communicating sets of topographic information to and from information processing and viewing devices by means of an accessible network, each of the sets being specific to an individual golf course, comprising:
  (a) a first information processing and viewing device receiving input of a first set of information, said first set of information being data representative of a golf course topography, said first set of information including data elements relating to attributes of the golf course, said data elements including at least one location for each attribute in the set;

(b) a second set of information relating to at least one ball location as a result of playing the golf course by at least one individual;

(c) a central information processing site and database receiving said first and second sets of information from said first information processing and viewing device and providing access to said sets over the network; and (d) a second information processing and viewing device receiving transmission of said first and second sets of information, displaying the playing of the golf course as a moving representation with respect to said golf course topography, and replaying said moving representation in at least one alterable manner including an adjustable replay speed for said moving representation.

83. The system of claim 82 wherein a user application is entered into said first information processing and viewing device, said user application including player software suited for an application selected from the group consisting of navigation, hiking, hunting, biking, farming, and golfing, wherein said player software displays a moving representation for said application in at least one alterable manner, including an adjustable replay speed for said application's moving representation.

84. The system of claim 82 wherein a user application is entered into said second information processing and viewing device, said user application including player software suited for an application selected from the group consisting of navigation, hiking, hunting, biking, farming, and golfing, wherein said player software displays a moving representation for said application in at least one alterable manner, including an adjustable replay speed for said application's moving representation.

85. The system of claim 82 wherein said first information processing and viewing device comprises:

a position module with an antenna receiving location data; and a display module being in operable communication with said position module for receiving said first set of information, said display module comprising a portable hand-held personal computer and a viewer, wherein said portable computer determines a relative accuracy of each said location in said data elements, assigns said relative accuracy to said location data, and causes said viewer to display said location with said visual signifier to indicate said relative accuracy.

86. The system of claim 82 wherein said first information processing and viewing device comprises a position module with an antenna, said information processing and viewing device generating at least one of said first and second sets of information with said antenna in a reception only mode.

\* \* \* \* \*

US006456938C1

(12) INTER PARTES REEXAMINATION CERTIFICATE (0407th)
United States Patent
Barnard

(10) Number: US 6,456,938 C1
(45) Certificate Issued: Jul. 17, 2012

(54) PERSONAL DGPS GOLF COURSE CARTOGRAPHER, NAVIGATOR AND INTERNET WEB SITE WITH MAP EXCHANGE AND TUTOR

(75) Inventor: Kent Deon Barnard, Wayne City, IL (US)

(73) Assignee: Lasalle Business Credit, LLC, Chicago, IL (US)

Reexamination Request:
No. 95/001,752, Sep. 23, 2011

Reexamination Certificate for:
Patent No.: 6,456,938
Issued: Sep. 24, 2002
Appl. No.: 09/620,784
Filed: Jul. 21, 2000

Related U.S. Application Data

(60) Provisional application No. 60/145,143, filed on Jul. 23, 1999.

(51) Int. Cl.
*G01S 5/00* (2006.01)
*G01C 21/00* (2006.01)

(52) U.S. Cl. .................... 701/213; 340/990; 342/357.31; 473/407; 701/208

(58) Field of Classification Search .................. None
See application file for complete search history.

(56) References Cited

To view the complete listing of prior art documents cited during the proceeding for Reexamination Control Number 95/001,752, please refer to the USPTO's public Patent Application Information Retrieval (PAIR) system under the Display References tab.

*Primary Examiner* — Salman Ahmed

(57) ABSTRACT

A personal owned palm-held device consisting of software executed on a palm-held personal computer (PC) saddled into and connected directly to a dGPS receiver such that an individual golf player may map a golf course by traversing its attributes, displaying said map and collecting golf play data for any golf course. In addition, the ability to upload and download golf course maps to an Internet web site shall reduce the need for subsequent users to repeat the effort of mapping the same course more than once. Also, downloadable courses will facilitate the use of the palm-held PC by users that do not have a dGPS attachment. When used without a dGPS attachment, ball locations will be determined manually by estimating the ball location with reference to visual salient course attributes.

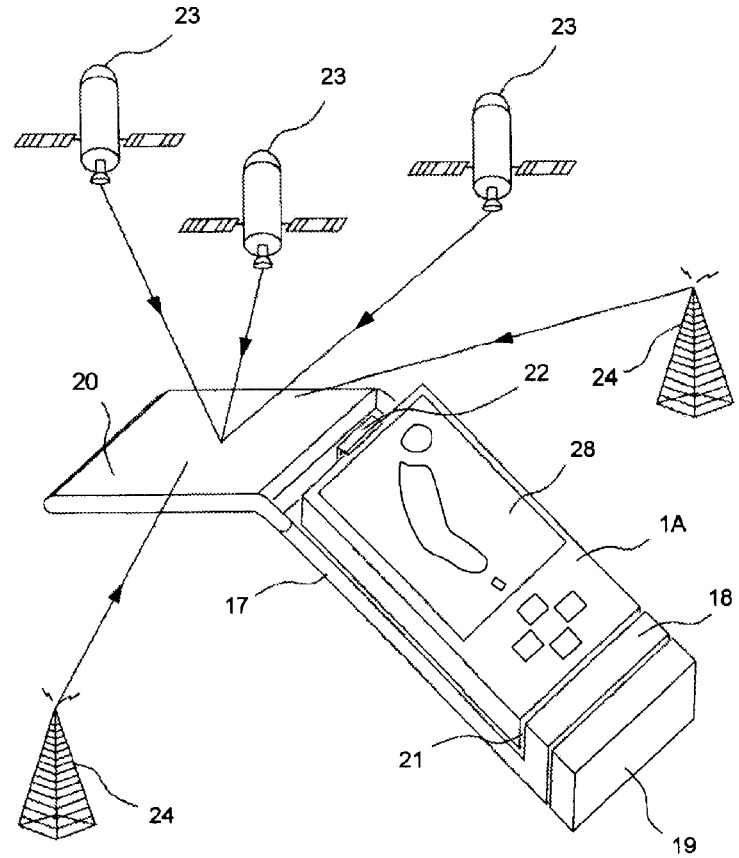

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 55 and 56 are cancelled.
Claims 1-54 and 57-86 were not reexamined.

\* \* \* \* \*

US006456938C2

(12) EX PARTE REEXAMINATION CERTIFICATE (9669th)

United States Patent
Barnard

(10) Number: US 6,456,938 C2
(45) Certificate Issued: May 17, 2013

(54) PERSONAL DGPS GOLF COURSE CARTOGRAPHER, NAVIGATOR AND INTERNET WEB SITE WITH MAP EXCHANGE AND TUTOR

(75) Inventor: Kent Deon Barnard, Wayne City, IL (US)

(73) Assignee: Lasalle Business Credit, LLC, Chicago, IL (US)

Reexamination Request:
No. 90/012,223, Mar. 30, 2012

Reexamination Certificate for:
Patent No.: 6,456,938
Issued: Sep. 24, 2002
Appl. No.: 09/620,784
Filed: Jul. 21, 2000

Reexamination Certificate C1 6,456,938 issued Jul. 17, 2012

Related U.S. Application Data

(60) Provisional application No. 60/145,143, filed on Jul. 23, 1999.

(51) Int. Cl.
*G01C 15/00* (2006.01)
*G01C 22/00* (2006.01)
*G01C 21/26* (2006.01)
*G01C 21/20* (2006.01)
*G01S 19/19* (2010.01)

(52) U.S. Cl.
USPC ...... 701/454; 340/990; 342/357.31; 473/407; 701/487

(58) Field of Classification Search
None
See application file for complete search history.

(56) References Cited

To view the complete listing of prior art documents cited during the proceeding for Reexamination Control Number 90/012,223, please refer to the USPTO's public Patent Application Information Retrieval (PAIR) system under the Display References tab.

*Primary Examiner* — Salman Ahmed

(57) ABSTRACT

A personal owned palm-held device consisting of software executed on a palm-held personal computer (PC) saddled into and connected directly to a dGPS receiver such that an individual golf player may map a golf course by traversing its attributes, displaying said map and collecting golf play data for any golf course. In addition, the ability to upload and download golf course maps to an Internet web site shall reduce the need for subsequent users to repeat the effort of mapping the same course more than once. Also, downloadable courses will facilitate the use of the palm-held PC by users that do not have a dGPS attachment. When used without a dGPS attachment, ball locations will be determined manually by estimating the ball location with reference to visual salient course attributes.

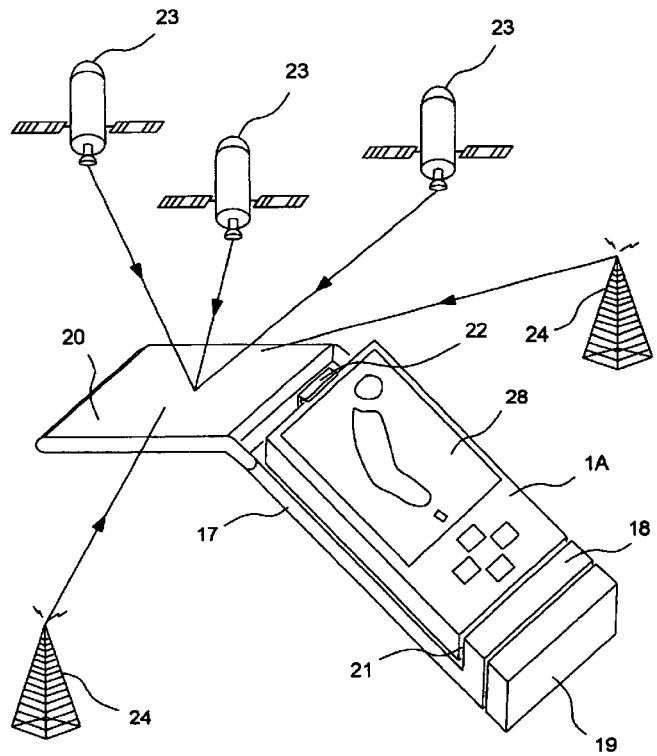

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 8-11, 13, 14 and 20-23 is confirmed.

Claims 55 and 56 were previously cancelled.

Claims 3-7, 12, 15-19, 24-54 and 57-86 were not reexamined.

* * * * *